United States Patent
Pang

(10) Patent No.: US 11,395,333 B2
(45) Date of Patent: Jul. 19, 2022

(54) UPLINK SIGNAL TRANSMISSION METHOD, TERMINAL, NETWORK DEVICE, AND SYSTEM

(71) Applicant: HUAWEI TECHNOLOGIES CO., LTD., Guangdong (CN)

(72) Inventor: Jiyong Pang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 42 days.

(21) Appl. No.: 16/861,955

(22) Filed: Apr. 29, 2020

(65) Prior Publication Data
US 2020/0260490 A1    Aug. 13, 2020

Related U.S. Application Data

(63) Continuation of application No. PCT/CN2018/108858, filed on Sep. 29, 2018.

(30) Foreign Application Priority Data

Oct. 31, 2017    (CN) .......................... 201711062363.8

(51) Int. Cl.
H04W 74/08    (2009.01)
H04W 56/00    (2009.01)
H04L 5/00    (2006.01)
H04L 27/26    (2006.01)

(52) U.S. Cl.
CPC ....... H04W 74/0808 (2013.01); H04L 5/0082 (2013.01); H04L 27/2607 (2013.01); H04W 56/0045 (2013.01)

(58) Field of Classification Search
CPC ............. H04W 74/08; H04W 74/0808; H04W 74/08016; H04W 74/0833; H04W 72/042;
(Continued)

(56) References Cited

U.S. PATENT DOCUMENTS

2016/0100406 A1    4/2016 Chen et al.
2016/0105422 A1    4/2016 Burch et al.
(Continued)

FOREIGN PATENT DOCUMENTS

CN    106376089 A    2/2017
CN    106559844 A    4/2017
(Continued)

OTHER PUBLICATIONS

3GPP TSG RAN WG1 Meeting #84bis,R1-162131,:"Discussion on CCA gap and symbol position for PUSCH and SRS for eLAA",Huawei, HiSilicon,Busan, Korea, Apr. 11 15, 2016,total 5 pages.
(Continued)

*Primary Examiner* — Marcus Smith
(74) *Attorney, Agent, or Firm* — Womble Bond Dickinson (US) LLP

(57) ABSTRACT

Embodiments of this disclosure disclose an uplink signal transmission method, which comprises: reserving, by a first terminal, a first time interval on an uplink data transmission channel, where the first terminal does not send uplink data within the first time interval, the first time interval is used by a second terminal to perform channel listening before sending a random access preamble, and the first time interval is determined by using one or more of the following parameters: a start moment at which the uplink data transmission channel arrives at a network device, an end moment at which the uplink data transmission channel arrives at the network device, a start moment at which the second terminal performs the channel listening, an end moment at which the second terminal performs the channel listening, duration in which the second terminal performs the channel listening, or an uplink timing advance of the first terminal.

7 Claims, 20 Drawing Sheets

(58) Field of Classification Search
CPC ............ H04W 72/0446; H04W 72/12; H04W 72/1268; H04W 72/1284; H04W 72/1289; H04L 5/0091–0098
See application file for complete search history.

(56) References Cited

U.S. PATENT DOCUMENTS

| | | |
|---|---|---|
| 2017/0222776 A1 | 8/2017 | Dinan |
| 2017/0223635 A1 | 8/2017 | Dinan |
| 2019/0037607 A1* | 1/2019 | Ahn .................. H04W 74/0833 |
| 2019/0313450 A1* | 10/2019 | Mukherjee ........ H04W 56/0045 |
| 2019/0357270 A1* | 11/2019 | Kurth .................... H04W 76/27 |
| 2020/0267694 A1* | 8/2020 | Zhang ............... H04W 74/0808 |
| 2020/0404648 A1* | 12/2020 | Kim .................. H04W 72/0446 |

FOREIGN PATENT DOCUMENTS

| | | |
|---|---|---|
| CN | 106656895 A | 5/2017 |
| CN | 106686603 A | 5/2017 |
| CN | 106937403 A | 7/2017 |
| CN | 107046732 A | 8/2017 |
| WO | 2017171999 A1 | 10/2017 |

OTHER PUBLICATIONS

3GPP TSG RAN WG1 Meeting #85,R1-164199: PRACH design for Rel-14 eLAA CATT Nanjing, China May 23-27, 2016 total 4 pages.
Intel Corporation, Uplink transmission with LBT. 3GPP TSG-RAN WG2 #89bis Bratislava, Slovakia, Apr. 20-24, 2015, R2-151102, 6 pages.

* cited by examiner

UPLINK SIGNAL TRANSMISSION METHOD, TERMINAL, NETWORK DEVICE, AND SYSTEM

CROSS-REFERENCE TO RELATED APPLICATIONS

This application is a continuation of International Application No. PCT/CN2018/108858, filed on Sep. 29, 2018, which claims priority to Chinese Patent Application No. 201711062363.8, filed on Oct. 31, 2017, The disclosures of the aforementioned applications are hereby incorporated by reference in their entireties.

TECHNICAL FIELD

This disclosure relates to the field of communications technologies, and in particular, to an uplink signal transmission method, a terminal, a network device, and a system.

BACKGROUND

Before transmitting data on an unlicensed spectrum, a terminal or a network device usually should comply with a listen before talk (LBT) rule. In other words, the terminal or the network device should perform channel listening before sending data. If a channel is idle, data can be sent; otherwise, data cannot be sent. As shown in FIG. 1, when a first terminal UE 0 is scheduled to perform transmission on a physical uplink shared channel (PUSCH) in a plurality of consecutive slots (three slots are shown FIG. 1 as an example), the UE 0 performs LBT before the transmission. If the LBT succeeds, the UE 0 may continuously perform uplink transmission within a channel occupancy time (COT). However, if another UE (for example, a second terminal UE 1) initiates a random access (RA) process during the transmission performed by the UE 0, the another UE should perform LBT before a physical random access channel (PRACH) starts. Because uplink transmission performed by the UE 0 causes interference to the LBT of the UE 1, the UE 1 cannot initiate the RA process due to an LBT failure. This phenomenon may be referred to as uplink transmission blocking. The PRACH has a higher priority or importance than the PUSCH. If the phenomenon that the PUSCH blocks the PRACH is not handled, uplink random access of a user is relatively greatly affected. Therefore, how to avoid interference caused by the PUSCH to the LBT before the PRACH is a technical problem that should be resolved currently.

SUMMARY

Embodiments of this disclosure provide an uplink signal transmission method, a terminal, a network device, and a system, to avoid interference caused by an uplink data transmission channel to channel listening before a physical random access channel, and improve a success rate of transmission on the physical random access channel.

The embodiments of the present disclosure may be specifically implemented by using the following technical solutions:

According to a first aspect, this disclosure provides an uplink signal transmission method, applied to a terminal side. The method includes: reserving, by a first terminal, a first time interval on an uplink data transmission channel (PUSCH), where the first terminal does not send uplink data within the first time interval, the first time interval is used by a second terminal to perform channel listening (LBT) before sending a random access preamble (RA Preamble), and the first time interval is determined by using one or more of the following parameters: a start moment (which is represented by a symbol t1) at which the uplink data transmission channel arrives at a network device, an end moment (which is represented by a symbol t2) at which the uplink data transmission channel arrives at the network device, a start moment (which is represented by a symbol t3) at which the second terminal performs the channel listening, an end moment (which is represented by a symbol t4) at which the second terminal performs the channel listening, duration (which is represented by a symbol $T_{LBT}$) in which the second terminal performs the channel listening, and an uplink timing advance (TA) of the first terminal.

According to a second aspect, this disclosure provides an uplink signal transmission method, applied to a terminal side. The method includes: performing, by a second terminal, channel listening within a first time interval, where the channel listening is channel listening (LBT) performed by the second terminal before a random access preamble (RA Preamble) is sent, the first time interval is reserved by a first terminal on an uplink data transmission channel (PUSCH), the first terminal does not send uplink data within the first time interval, and the first time interval is determined by using one or more of the following parameters: a start moment (t1) at which the uplink data transmission channel arrives at a network device, an end moment (t2) at which the uplink data transmission channel arrives at the network device, a start moment (t3) at which the second terminal performs the channel listening, an end moment (t4) at which the second terminal performs the channel listening, duration ($T_{LBT}$) in which the second terminal performs the channel listening, and an uplink timing advance (TA) of the first terminal.

According to a third aspect, this disclosure provides an uplink signal transmission method, applied to a network device side. The method includes: sending, by a network device to a first terminal, indication information used to indicate a first time interval, where the first time interval is reserved by the first terminal on an uplink data transmission channel (PUSCH), the first terminal does not send uplink data within the first time interval, the first time interval is used by a second terminal to perform channel listening (LBT) before sending a random access preamble (RA Preamble), and the first time interval is determined by using one or more of the following parameters: a start moment (t1) at which the uplink data transmission channel arrives at the network device, an end moment (t2) at which the uplink data transmission channel arrives at the network device, a start moment (t3) at which the second terminal performs the channel listening, an end moment (t4) at which the second terminal performs the channel listening, duration ($T_{LBT}$) in which the second terminal performs the channel listening, and an uplink timing advance (TA) of the first terminal.

Though implementation of the method according to the first aspect, the second aspect, or the third aspect, the first terminal reserves the first time interval on the uplink data transmission channel, so that the second terminal performs the channel listening before a physical random access channel within the first time interval, thereby avoiding interference caused by the uplink data transmission channel to the channel listening before the physical random access channel, and improving a success rate of transmission on the physical random access channel.

With reference to the first aspect, the second aspect, or the third aspect, the first time interval in this disclosure mainly includes the following four cases. The following describes the four cases in detail:

if $0 \leq t1-t4 < TA$, a start moment (which is represented by a symbol t5) of the first time interval is equal to $t1-\frac{1}{2} \times TA$, and an end moment (which is represented by a symbol t6) of the first time interval is equal to $t4+\frac{1}{2} \times TA$; or if $0 < t4-t1 \leq T_{LBT}$, $t5=t1-\frac{1}{2} \times TA$ and $t6=t4+\frac{1}{2} \times TA$; or if $T_{LBT} < t4-t1 \leq t2-t1-\frac{1}{2} \times TA$, $t5=t4-\frac{1}{2} \times TA - T_{LBT}$ and $t6=t4+\frac{1}{2} \times TA$; or if $t2-t1-\frac{1}{2} \times TA < t4-t1 < t2-t1+T_{LBT}$, $t5=t4-\frac{1}{2} \times TA - T_{LBT}$ and $t6=t2-\frac{1}{2} \times TA$.

With reference to the first aspect, the second aspect, or the third aspect, in a first implementation, the first time interval is determined by the network device. In a second implementation, the first time interval is determined by the first terminal. The following separately describes the two implementations.

In the first implementation, before the first terminal reserves the first time interval on the uplink data transmission channel, the first terminal receives the indication information sent by the network device, and the first terminal learns of or determines the first time interval according to the indication information. Herein, the indication information is used to indicate the start moment of the first time interval and the end moment of the first time interval; or the indication information is used to indicate the start moment of the first time interval and duration of the first time interval; or the indication information is used to indicate the end moment of the first time interval and duration of the first time interval.

In other words, before the network device sends, to the first terminal, the indication information used to indicate the first time interval, the network device determines the first time interval based on one or more parameters of the start moment at which the first terminal sends the uplink data transmission channel, the end moment at which the first terminal sends the uplink data transmission channel, the start moment at which the second terminal performs the channel listening, the end moment at which the second terminal performs the channel listening, the duration in which the second terminal performs the channel listening, and the uplink timing advance of the first terminal.

In this manner, the first terminal determines, based on signaling of the network device, whether to avoid and how long to avoid impact on the LBT before the PRACH, instead of actively avoiding, based on a location of a PRACH slot, the impact on the LBT before the PRACH. In this way, calculation overheads of the first terminal can be reduced, and an excessive waste of resources that is caused by active avoidance of the first terminal (for example, a case in which a relatively large quantity of PRACH slots are configured in a network, but a relatively small quantity of users actually need to initiate uplink access) can be avoided.

Optionally, the indication information may be directly the start moment of the first time interval and the end moment of the first time interval; or the indication information may be directly the start moment of the first time interval and the duration of the first time interval; or the indication information may be directly the end moment of the first time interval and the duration of the first time interval.

Optionally, the indication information may include an index value used to indicate the first time interval. The first terminal queries a prestored record table based on the index value, and obtains, from the record table, a start moment of the first time interval and an end moment of the first time interval that correspond to the index value; or the first terminal queries a prestored record table based on the index value, and obtains, from the record table, a start moment of the first time interval and duration of the first time interval that correspond to the index value; or the first terminal queries a prestored record table based on the index value, and obtains, from the record table, an end moment of the first time interval and duration of the first time interval that correspond to the index value.

Optionally, the indication information may include an index value used to indicate the first time interval and an identifier used to indicate a subcarrier used for communication between the first terminal and the network device. The first terminal determines a record table based on the identifier of the subcarrier, and different subcarriers correspond to different record tables. Then, the first terminal queries, based on the determined record table, a start moment of the first time interval and an end moment of the first time interval that correspond to the index value; or queries, based on the determined record table, a start moment of the first time interval and duration of the first time interval that correspond to the index value; or queries, based on the determined record table, an end moment of the first time interval and duration of the first time interval that correspond to the index value.

Optionally, the indication information may be notified by the network device to the first terminal by using signaling. Herein, the signaling may include but is not limited to downlink control information (DCI).

In the second implementation, before the first terminal reserves the first time interval on the uplink data transmission channel, the first terminal receives, from the network device, one or more parameters of the start moment at which the uplink data transmission channel arrives at the network device, the end moment at which the uplink data transmission channel arrives at the network device, a start moment for sending the random access preamble, the duration in which the second terminal performs the channel listening, and the uplink timing advance of the first terminal. The first terminal determines the first time interval based on one or more parameters of the start moment at which the uplink data transmission channel arrives at the network device, the end moment at which the uplink data transmission channel arrives at the network device, the start moment for sending the random access preamble, the duration in which the second terminal performs the channel listening, and the uplink timing advance of the first terminal.

In this manner, the first terminal may alternatively actively avoid, based on the location of the PRACH slot, the impact on the LBT before the PRACH, thereby reducing signaling overheads.

Optionally, the start moment at which the uplink data transmission channel arrives at the network device, the end moment at which the uplink data transmission channel arrives at the network device, the start moment for sending the random access preamble, the duration in which the second terminal performs the channel listening, and the uplink timing advance of the first terminal may be broadcast by the network device, or may be sent by the network device to the first terminal by using signaling.

Optionally, a granularity of the first time interval may be a symbol, a slot, or a microsecond (μs).

According to a fourth aspect, this disclosure provides an uplink signal transmission method, applied to a terminal side. The method includes: ending, by a first terminal a first time interval in advance, transmission of uplink data on an uplink data transmission channel (PUSCH), where duration of the first time interval is equal to duration in which a second terminal performs channel listening. In other words, the first terminal stops transmitting the PUSCH at a start moment of the first time interval.

According to a fifth aspect, this disclosure provides an uplink signal transmission method, applied to a terminal side. The method includes: performing, by a second terminal, channel listening within a first time interval, where the channel listening is channel listening performed by the second terminal before a random access preamble is sent, the first time interval is reserved by a first terminal for ending transmission on an uplink data transmission channel in advance, and duration of the first time interval is equal to duration in which the second terminal performs the channel listening.

According to a sixth aspect, this disclosure provides an uplink signal transmission method, applied to a network device side. The method includes: sending, by a network device to a first terminal, indication information used to indicate a first time interval, where the first time interval is reserved by the first terminal for ending transmission on an uplink data transmission channel in advance, and duration of the first time interval is equal to duration in which a second terminal performs channel listening.

Through implementation of the method according to the fourth aspect, the fifth aspect, or the sixth aspect, the first terminal terminates the transmission of the uplink data on the uplink data transmission channel in advance, to reserve the first time interval, so that the second terminal performs the channel listening before a physical random access channel within the first time interval, thereby avoiding interference caused by the uplink data transmission channel to the channel listening before the physical random access channel, and improving a success rate of transmission on the physical random access channel.

With reference to the fourth aspect, the fifth aspect, or the sixth aspect, in a first implementation, the first time interval is determined by the network device. In a second implementation, the first time interval is determined by the first terminal. The following separately describes the two implementations.

In the first implementation, before the first terminal ends, the first time interval in advance, the transmission of the uplink data on the uplink data transmission channel (PUSCH), the first terminal receives the indication information sent by the network device, and the first terminal learns of or determines the first time interval according to the indication information. Herein, the indication information is used to indicate the start moment of the first time interval and an end moment of the first time interval; or the indication information is used to indicate the start moment of the first time interval and the duration of the first time interval; or the indication information is used to indicate an end moment of the first time interval and the duration of the first time interval.

In other words, before the network device sends, to the first terminal, the indication information used to indicate the first time interval, the network device determines the first time interval based on an end moment at which the first terminal sends the uplink data transmission channel, a start moment at which the second terminal performs the channel listening, and the duration in which the second terminal performs the channel listening.

In this manner, the first terminal determines, based on signaling of the network device, whether to avoid and how long to avoid impact on the LBT before the PRACH, instead of actively avoiding, based on a location of a PRACH slot, the impact on the LBT before the PRACH. In this way, calculation overheads of the first terminal can be reduced, and an excessive waste of resources that is caused by active avoidance of the first terminal (for example, a case in which a relatively large quantity of PRACH slots are configured in a network, but a relatively small quantity of users actually need to initiate uplink access) can be avoided.

Optionally, the indication information may be directly the start moment of the first time interval and the end moment of the first time interval; or the indication information may be directly the start moment of the first time interval and the duration of the first time interval; or the indication information may be directly the end moment of the first time interval and the duration of the first time interval.

Optionally, the indication information may include an index value used to indicate the first time interval. The first terminal queries a prestored record table based on the index value, and obtains, from the record table, a start moment of the first time interval and an end moment of the first time interval that correspond to the index value; or the first terminal queries a prestored record table based on the index value, and obtains, from the record table, a start moment of the first time interval and duration of the first time interval that correspond to the index value; or the first terminal queries a prestored record table based on the index value, and obtains, from the record table, an end moment of the first time interval and duration of the first time interval that correspond to the index value.

Optionally, the indication information may include an index value used to indicate the first time interval and an identifier used to indicate a subcarrier used for communication between the first terminal and the network device. The first terminal determines a record table based on the identifier of the subcarrier, and different subcarriers correspond to different record tables. Then, the first terminal queries, based on the determined record table, a start moment of the first time interval and an end moment of the first time interval that correspond to the index value; or queries, based on the determined record table, a start moment of the first time interval and duration of the first time interval that correspond to the index value; or queries, based on the determined record table, an end moment of the first time interval and duration of the first time interval that correspond to the index value.

Optionally, the indication information may be notified by the network device to the first terminal by using signaling. Herein, the signaling may include but is not limited to downlink control information (DCI).

In the second implementation, before the first terminal ends, the first time interval in advance, the transmission of the uplink data on the uplink data transmission channel (PUSCH), the first terminal receives, from the network device, the end moment at which the uplink data transmission channel arrives at the network device, a start moment for sending the random access preamble, and the duration in which the second terminal performs the channel listening. The first terminal determines the first time interval based on the end moment at which the uplink data transmission channel arrives at the network device, the start moment for sending the random access preamble, and the duration in which the second terminal performs the channel listening.

In this manner, the first terminal may alternatively actively avoid, based on the location of the PRACH slot, the impact on the LBT before the PRACH, thereby reducing signaling overheads.

Optionally, the end moment at which the uplink data transmission channel arrives at the network device, the start moment for sending the random access preamble, and the duration in which the second terminal performs the channel listening may be broadcast by the network device, or may be sent by the network device to the first terminal by using signaling.

Optionally, a granularity of the first time interval may be a symbol, a slot, or a microsecond (μs).

According to a seventh aspect, this disclosure provides an uplink signal sending method, applied to a terminal side. The method includes: delaying, by a first terminal, transmission of uplink data on an uplink data transmission channel (PUSCH) for a first time interval, where the first time interval is used by a second terminal to perform channel listening before sending a random access preamble, and duration of the first time interval is equal to an uplink timing advance of the first terminal; in other words, the first terminal starts to transmit the PUSCH only at an end moment of the first time interval.

According to an eighth aspect, this disclosure provides an uplink signal transmission method, applied to a terminal side. The method includes: performing, by a second terminal, channel listening within a first time interval, where the channel listening is channel listening performed by the second terminal before a random access preamble is sent, the first time interval is reserved by a first terminal for delaying transmission of an uplink data transmission channel, and duration of the first time interval is equal to an uplink timing advance of the first terminal.

According to a ninth aspect, this disclosure provides an uplink signal transmission method, applied to a network device side. The method includes: sending, by a network device to a first terminal, indication information used to indicate a first time interval, where the first time interval is reserved by the first terminal for delaying transmission of an uplink data transmission channel, and duration of the first time interval is equal to an uplink timing advance of the first terminal.

Through implementation of the method according to the seventh aspect, the eighth aspect, or the ninth aspect, the first terminal delays starting the transmission of the uplink data on the uplink data transmission channel, to reserve the first time interval, so that the second terminal performs the channel listening before a physical random access channel within the first time interval, thereby avoiding interference caused by the uplink data transmission channel to the channel listening before the physical random access channel, and improving a success rate of transmission on the physical random access channel.

With reference to the seventh aspect, the eighth aspect, or the ninth aspect, in a first implementation, the first time interval is determined by the network device. In a second implementation, the first time interval is determined by the first terminal. The following separately describes the two implementations.

In the first implementation, before the first terminal delays starting the transmission of the uplink data on the uplink data transmission channel (PUSCH) for the first time interval, the first terminal receives the indication information sent by the network device, and the first terminal learns of or determines the first time interval according to the indication information. Herein, the indication information is used to indicate a start moment of the first time interval and the end moment of the first time interval; or the indication information is used to indicate a start moment of the first time interval and the duration of the first time interval; or the indication information is used to indicate the end moment of the first time interval and the duration of the first time interval.

In other words, before the network device sends, to the first terminal, the indication information used to indicate the first time interval, the network device determines the first time interval based on a start moment at which the first terminal sends the uplink data transmission channel, a start moment at which the second terminal performs the channel listening, and the uplink timing advance of the first terminal.

In this manner, the first terminal determines, based on signaling of the network device, whether to avoid and how long to avoid impact on the LBT before the PRACH, instead of actively avoiding, based on a location of a PRACH slot, the impact on the LBT before the PRACH. In this way, calculation overheads of the first terminal can be reduced, and an excessive waste of resources that is caused by active avoidance of the first terminal (for example, a case in which a relatively large quantity of PRACH slots are configured in a network, but a relatively small quantity of users actually need to initiate uplink access) can be avoided.

Optionally, the indication information may be directly the start moment of the first time interval and the end moment of the first time interval; or the indication information may be directly the start moment of the first time interval and the duration of the first time interval; or the indication information may be directly the end moment of the first time interval and the duration of the first time interval.

Optionally, the indication information may include an index value used to indicate the first time interval. The first terminal queries a prestored record table based on the index value, and obtains, from the record table, a start moment of the first time interval and an end moment of the first time interval that correspond to the index value; or the first terminal queries a prestored record table based on the index value, and obtains, from the record table, a start moment of the first time interval and duration of the first time interval that correspond to the index value; or the first terminal queries a prestored record table based on the index value, and obtains, from the record table, an end moment of the first time interval and duration of the first time interval that correspond to the index value.

Optionally, the indication information may include an index value used to indicate the first time interval and an identifier used to indicate a subcarrier used for communication between the first terminal and the network device. The first terminal determines a record table based on the identifier of the subcarrier, and different subcarriers correspond to different record tables. Then, the first terminal queries, based on the determined record table, a start moment of the first time interval and an end moment of the first time interval that correspond to the index value; or queries, based on the determined record table, a start moment of the first time interval and duration of the first time interval that correspond to the index value; or queries, based on the determined record table, an end moment of the first time interval and duration of the first time interval that correspond to the index value.

Optionally, the indication information may be notified by the network device to the first terminal by using signaling. Herein, the signaling may include but is not limited to downlink control information (DCI).

In the second implementation, before the first terminal delays starting the transmission of the uplink data on the uplink data transmission channel (PUSCH) for the first time interval, the first terminal receives, from the network device, the start moment at which the uplink data transmission channel arrives at the network device, a start moment for sending the random access preamble, and the uplink timing advance of the first terminal. The first terminal determines the first time interval based on the start moment at which the uplink data transmission channel arrives at the network device, the start moment for sending the random access preamble, and the uplink timing advance of the first terminal.

In this manner, the first terminal may alternatively actively avoid, based on the location of the PRACH slot, the impact on the LBT before the PRACH, thereby reducing signaling overheads.

Optionally, the start moment at which the uplink data transmission channel arrives at the network device, the start moment for sending the random access preamble, and the uplink timing advance of the first terminal may be broadcast by the network device, or may be sent by the network device to the first terminal by using signaling.

Optionally, a granularity of the first time interval may be a symbol, a slot, or a microsecond (µs).

According to a tenth aspect, this disclosure provides a terminal. The terminal is a first terminal, including a plurality of functional units, configured to correspondingly perform the uplink signal transmission method according to any one of the first aspect, the fourth aspect, or the seventh aspect, or the possible implementations thereof.

According to an eleventh aspect, this disclosure provides a terminal. The terminal is a second terminal, including a plurality of functional units, configured to correspondingly perform the uplink signal transmission method according to any one of the second aspect, the fifth aspect, or the eighth aspect, or the possible implementations thereof.

According to a twelfth aspect, this disclosure provides a network device, including a plurality of functional units, configured to correspondingly perform the uplink signal transmission method according to any one of the third aspect, the sixth aspect, or the ninth aspect, or the possible implementations thereof.

According to a thirteenth aspect, this disclosure provides a terminal. The terminal is a first terminal. The first terminal may include a memory, and a processor, a transmitter, and a receiver that are coupled to the memory. The transmitter is configured to send a signal to another wireless communications device, for example, a network device. The receiver is configured to receive a signal sent by the another wireless communications device, for example, the network device. The memory is configured to store code for implementing the uplink signal transmission method according to the first aspect, the fourth aspect, or the seventh aspect. The processor is configured to execute the program code stored in the memory, to be specific, perform the uplink signal transmission method according to any one of the first aspect, the fourth aspect, or the seventh aspect, or the possible implementations thereof.

According to a fourteenth aspect, this disclosure provides a terminal. The terminal is a second terminal. The second terminal may include a memory, and a processor, a transmitter, and a receiver that are coupled to the memory. The transmitter is configured to send a signal to another wireless communications device, for example, a network device. The receiver is configured to receive a signal sent by the another wireless communications device, for example, the network device. The memory is configured to store code for implementing the uplink signal transmission method according to the second aspect, the fifth aspect, or the eighth aspect. The processor is configured to execute the program code stored in the memory, to be specific, perform the uplink signal transmission method according to any one of the second aspect, the fifth aspect, or the eighth aspect, or the possible implementations thereof.

According to a fifteenth aspect, this disclosure provides a network device. The network device may include a memory, and a processor, a transmitter, and a receiver that are coupled to the memory. The transmitter is configured to send a signal to another wireless communications device, for example, a terminal. The receiver is configured to receive a signal sent by the another wireless communications device, for example, the terminal. The memory is configured to store code for implementing the uplink signal transmission method according to the third aspect, the sixth aspect, or the ninth aspect. The processor is configured to execute the program code stored in the memory, to be specific, perform the uplink signal transmission method according to any one of the third aspect, the sixth aspect, or the ninth aspect, or the possible implementations thereof.

According to a sixteenth aspect, this disclosure provides a communications system. The communications system includes a first terminal, a second terminal, and a network device. The first terminal may be the first terminal according to the tenth aspect or the thirteenth aspect. The second terminal may be the second terminal according to the eleventh aspect or the fourteenth aspect. The network device may be the network device according to the twelfth aspect or the fifteenth aspect.

According to a seventeenth aspect, this disclosure provides a computer-readable storage medium. The computer-readable storage medium stores an instruction, and when the instruction is run on a computer, the computer is enabled to perform the uplink signal transmission method according to the first aspect, the fourth aspect, or the seventh aspect.

According to an eighteenth aspect, this disclosure provides another computer-readable storage medium. The computer-readable storage medium stores an instruction, and when the instruction is run on a computer, the computer is enabled to perform the uplink signal transmission method according to the second aspect, the fifth aspect, or the eighth aspect.

According to a nineteenth aspect, this disclosure provides a computer-readable storage medium. The computer-readable storage medium stores an instruction, and when the instruction is run on a computer, the computer is enabled to perform the uplink signal transmission method according to the third aspect, the sixth aspect, or the ninth aspect.

According to a twentieth aspect, this disclosure provides a computer program product including an instruction, and when the computer program product is run on a computer, the computer is enabled to perform the uplink signal transmission method according to the first aspect, the fourth aspect, or the seventh aspect.

According to a twenty-first aspect, this disclosure provides another computer program product including an instruction, and when the computer program product is run on a computer, the computer is enabled to perform the uplink signal transmission method according to the second aspect, the fifth aspect, or the eighth aspect.

According to a twenty-second aspect, this disclosure provides another computer program product including an instruction, and when the computer program product is run on a computer, the computer is enabled to perform the uplink signal transmission method according to the third aspect, the sixth aspect, or the ninth aspect.

DESCRIPTION OF EMBODIMENTS

For ease of understanding this disclosure, a wireless communications system in this disclosure is first described.

Figure 2:
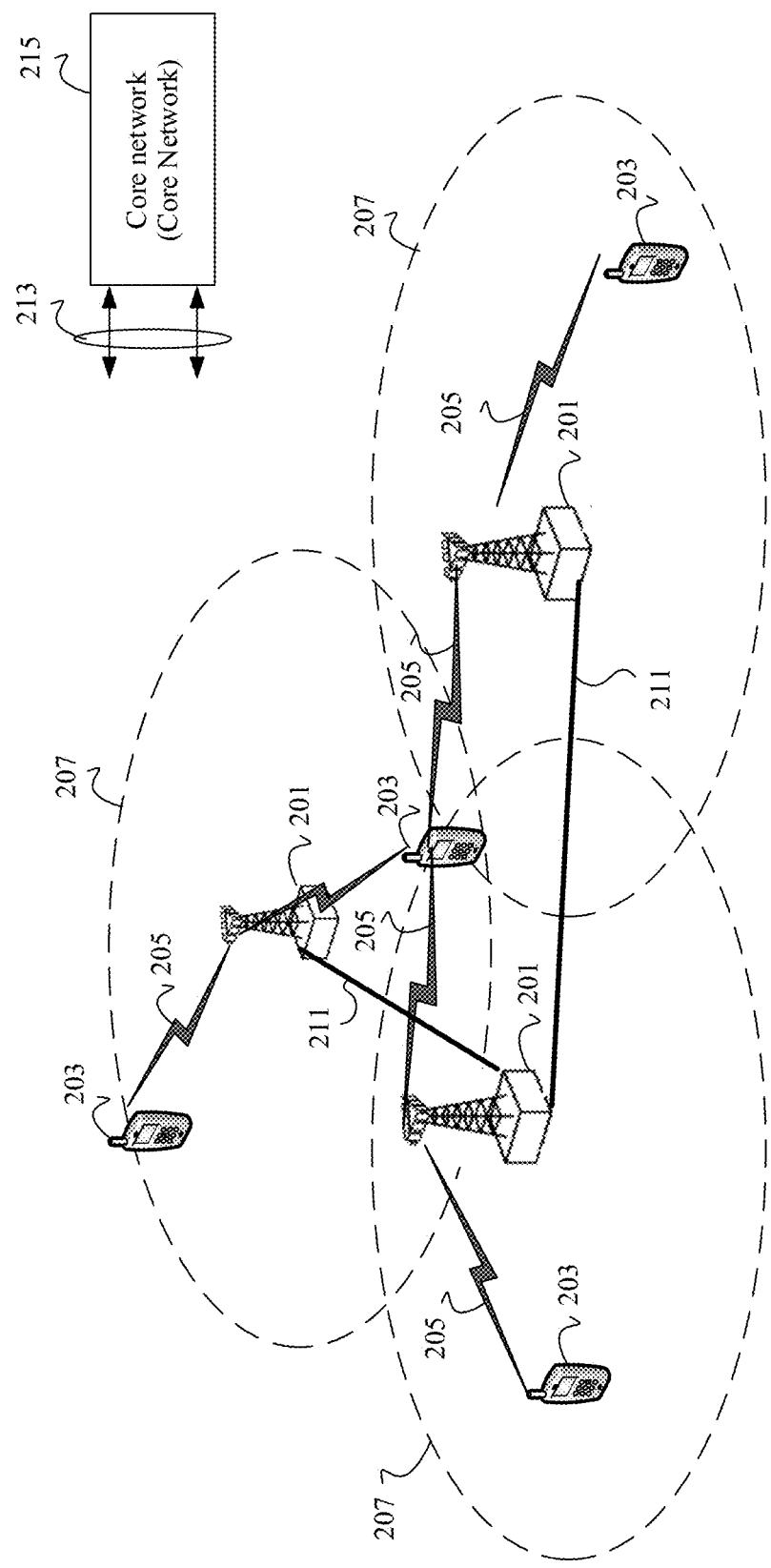
FIG. 2 is a schematic structural diagram of a wireless communications system according to this disclosure.

FIG. 2 shows a wireless communications system 200 in this disclosure. The wireless communications system 200 may work on a licensed frequency band, or may work on an unlicensed frequency band. It may be understood that use of the unlicensed frequency band can improve a system capacity of the wireless communications system 200. As shown in FIG. 2, the wireless communications system 200 includes one or more network devices (Base Station) 201, one or more terminals (Terminal) 203, and a core network 215.

The network device 201 may be configured to communicate with the terminal 203 under control of a network device controller (for example, a base station controller) (not shown). In some embodiments, the network device controller may be a part of the core network 215, or may be integrated into the network device 201.

The network device 201 may be configured to transmit control information or user data to the core network 215 by using a backhaul interface (for example, an S1 interface) 213.

The network device 201 may perform wireless communication with the terminal 203 by using one or more antennas. Each network device 201 may provide communication coverage for a coverage area 207 corresponding to the network device 201. The coverage area 207 corresponding to the network device 201 may be divided into a plurality of sectors, and one sector corresponds to a part of the coverage area (not shown).

The network devices 201 may also communicate with each other directly or indirectly by using a backhaul link 211. Herein, the backhaul link 211 may be a wired communication connection, or may be a wireless communication connection.

In some embodiments of this disclosure, the network device 201 may be a base transceiver station, a radio transceiver, a basic service set (BSS), an extended service set (ESS), a NodeB (Node B), an evolved NodeB (eNB or eNodeB), a next-generation NodeB (gNB), or the like. The wireless communications system 200 may include several different types of network devices 201, for example, a macro base station (macro base station) and a micro base station (micro base station). The network device 201 may apply different wireless technologies, for example, a cell radio access technology or a WLAN radio access technology.

The terminals 203 may be distributed in the entire wireless communications system 200, and may be static or moving. In some embodiments of this disclosure, the terminal 203 may be a mobile device, a mobile station, a mobile unit, a radio unit, a remote unit, a user agent, a mobile client, or the like.

In this disclosure, the wireless communications system 200 may be an LTE communications system, such as LTE-U, that is capable of working on an unlicensed frequency band; or may be a communications system, such as a 5G communications system or a future new radio communications system, that is capable of working on an unlicensed frequency band. The wireless communications system 200 may use a licensed-assisted access (LAA) solution to process access of the terminal on the unlicensed frequency band. In the LAA solution, a primary cell works on a licensed frequency band to transfer key messages and services that requires quality of service assurance, and a secondary cell works on an unlicensed frequency band to improve performance of a data plane.

In this disclosure, the wireless communications system 200 can support multi-carrier (e.g., waveform signals at different frequencies) operations. A multi-carrier transmitter can simultaneously transmit modulated signals on a plurality of carriers. For example, each communication connection 205 may carry multi-carrier signals modulated by using different wireless technologies. Each modulation signal may be sent on different carriers, or may carry control information (for example, a reference signal or a control channel), overhead information, data, or the like.

Because the unlicensed frequency band is a resource sharing frequency band, a specific mechanism should be used to ensure fairness between devices that use the frequency band resource. A resource contention method is based on a listen before talk (LBT) rule. For example, in the wireless communications system 200, some terminals 203 may initiate a random access process to the network device 201, and a first block, which may be an important block, of initiating the random access process by the terminal 203 is sending an RA preamble to the network device 201. Before sending the RA preamble, the terminal 203 should first detect whether a current channel is idle. If it is detected that the channel is idle within a time period, the terminal 203 may send the RA preamble. If it is detected that the channel is occupied, the terminal 203 cannot send the RA preamble currently. The network device 201 may estimate/detect an uplink timing offset between a user and the network device 201 based on the RA preamble sent by the terminal 203, and send an uplink timing advance (TA) to the terminal 203, so that the terminal 203 adjusts a start moment of uplink transmission of the terminal 203 based on the received TA, thereby ensuring that receiving moments at which uplink transmission of different users arrives at a network side are aligned. Only after an uplink transmission time of the terminal 203 is synchronized, the terminal 203 can be scheduled by the network device 201 to perform uplink transmission. When some terminals 203 use an unlicensed frequency band, each terminal 203 also should first detect whether a current channel is idle before transmitting an uplink data transmission channel (PUSCH). If it is detected that the channel is idle within a time period, the terminal 203 may send the PUSCH. If it is detected that the channel is occupied, the terminal 203 cannot send the PUSCH currently.

Figure 1:
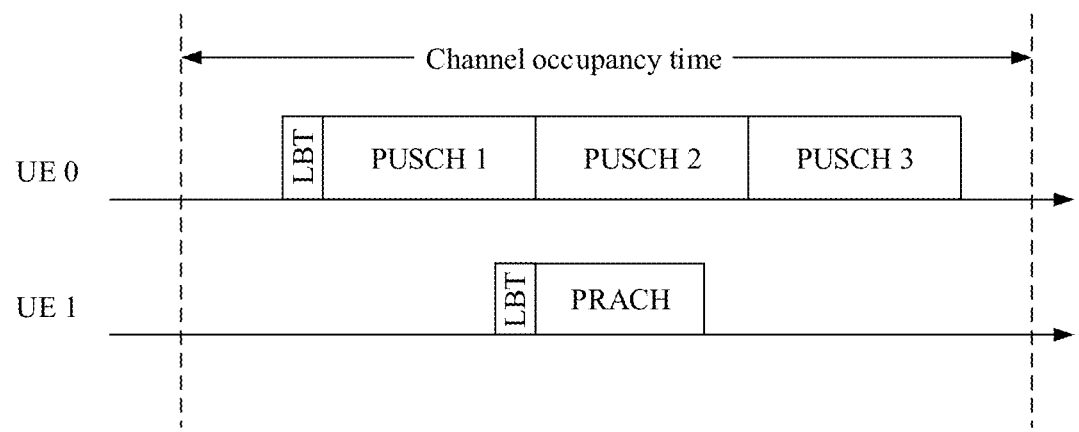
FIG. 1 is a schematic diagram of blocking transmission of a physical random access channel by a physical uplink shared channel according to this disclosure.

In this case, for a scenario shown in FIG. 1, in a process in which UE 0 transmits a PUSCH, UE 1 should perform LBT before a PRACH, so that the PUSCH of the UE 0 should reserve a time for the LBT of the UE 1, for the UE 1 to successfully perform the LBT, thereby preventing the PUSCH of the UE 0 from blocking a random access process of the UE 1, and improving a success rate of transmission on the PRACH. For ease of description, in the following embodiments, the LBT performed before the PRACH is named LBT_RA, to be specific, the LBT_RA is channel listening performed before an RA preamble is sent.

Figure 3:
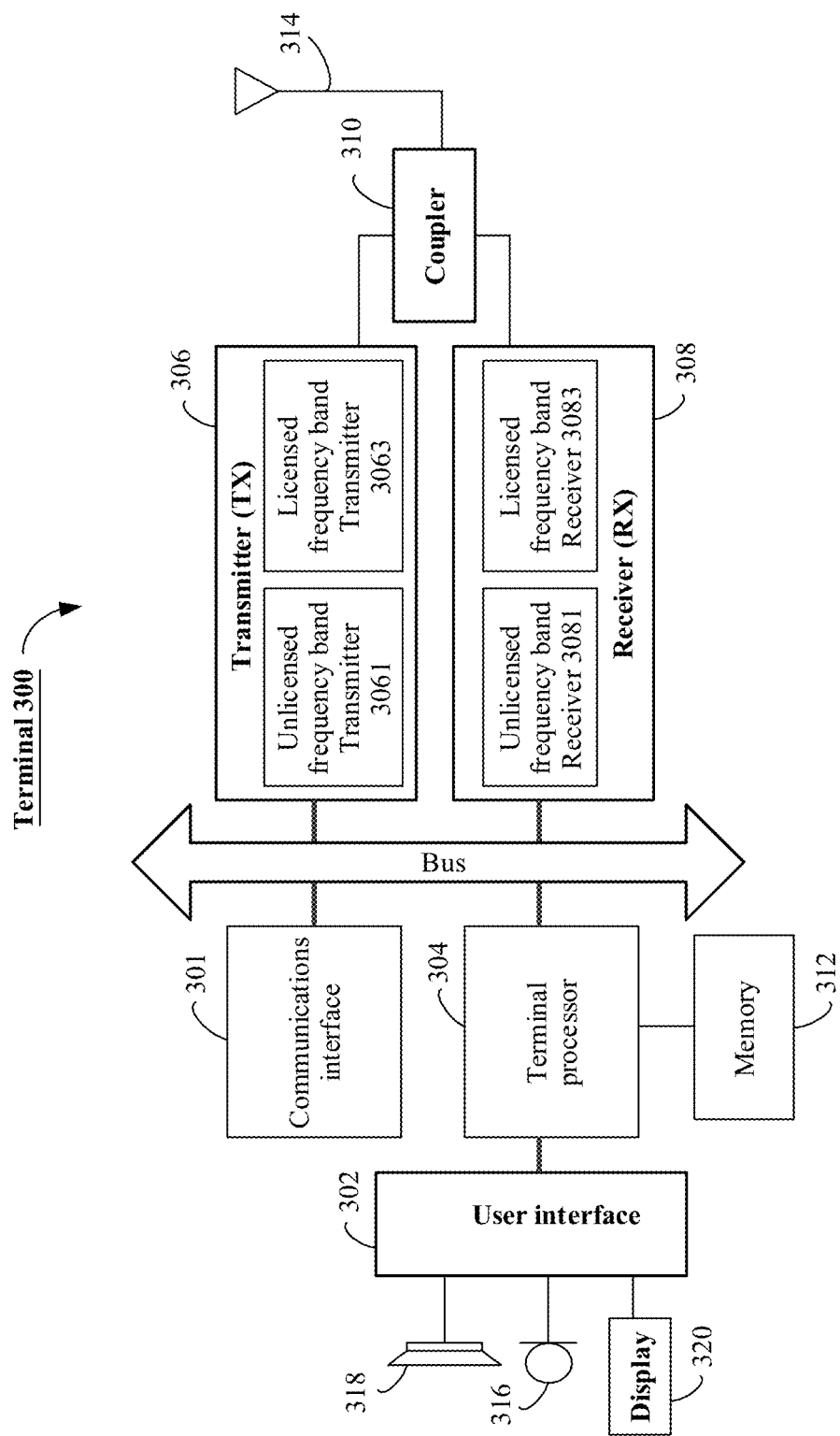
FIG. 3 is a schematic structural diagram of a terminal according to this disclosure.

FIG. 3 shows a terminal 300 according to some embodiments of this disclosure. As shown in FIG. 3, the terminal 300 may include input/output modules (including an audio input/output module 318, a key input module 316, a display 320, and the like), a user interface 302, one or more terminal processors 304, a transmitter 306, a receiver 308, a coupler 310, an antenna 314, and a memory 312. These components may be connected by using a bus or in another manner. In FIG. 3, an example in which the components are connected by using a bus is used.

A communications interface 301 may be used by the terminal 300 to communicate with another communications device, for example, a base station. Specifically, the base station may be a network device 400 shown in FIG. 4. Specifically, the communications interface 301 may include one or more of a global system for mobile communications (GSM) (2G) communications interface, a wideband code division multiple access (WCDMA) (3G) communications interface, a long term evolution (LTE) (4G) communications interface, and the like; or may be a 5G communications interface or a future new radio communications interface. The communications interface 301 is not limited to the wireless communications interface. A wired communications interface 301, for example, a local access network (LAN) interface, may further be configured for the terminal 300.

The antenna 314 may be configured to convert electromagnetic energy in a transmission line into an electromagnetic wave in free space, or convert an electromagnetic wave in free space into electromagnetic energy in a transmission line. The coupler 310 is configured to divide a mobile communication signal received by the antenna 314 into a plurality of signals, and allocate the plurality of signals to a plurality of receivers 308.

The transmitter 306 may be configured to transmit a signal output by the terminal processor 304, for example, modulate the signal onto a licensed or unlicensed frequency band. In some embodiments of this disclosure, the transmitter 306 may include an unlicensed frequency band transmitter 3061 and a licensed frequency band transmitter 3063. The unlicensed frequency band transmitter 3061 may support the terminal 300 in transmitting a signal on one or more unlicensed frequency bands, and the licensed frequency band transmitter 3063 may support the terminal 300 in transmitting a signal on one or more licensed frequency bands.

The receiver 308 may be configured to receive the mobile communication signal received by the antenna 314. For example, the receiver 308 may demodulate a received signal that has been modulated onto an unlicensed or licensed frequency band. In some embodiments of this disclosure, the receiver 308 may include an unlicensed frequency band receiver 3081 and a licensed frequency band receiver 3083. The unlicensed frequency band receiver 3081 may support the terminal 300 in receiving a signal that is modulated onto an unlicensed frequency band, and the licensed frequency band receiver 3083 may support the terminal 300 in receiving a signal that is modulated onto a licensed frequency band.

In some embodiments of this disclosure, the transmitter 306 and the receiver 308 may be considered as a wireless modem. In the terminal 300, there may be one or more transmitters 306 and one or more receivers 308.

In addition to the transmitter 306 and the receiver 308 shown in FIG. 3, the terminal 300 may further include other communications components, for example, a GPS module, a Bluetooth module, and a wireless fidelity (Wi-Fi) module. In addition to the wireless communication signal described above, the terminal 300 may further support other wireless communication signals, for example, a satellite signal and a short-wave signal. The terminal 300 is not limited to supporting wireless communication. A wired network interface (for example, a LAN interface) may further be configured for the terminal 300 to support wired communication.

The input/output modules may be configured to implement interaction between the terminal 300 and a user or an external environment, and may mainly include the audio input/output module 318, the key input module 316, the display 320, and the like. Specifically, the input/output modules may further include a camera, a touchscreen, a sensor, and the like. The input/output modules all communicate with the terminal processor 304 by using the user interface 302.

The memory 312 is coupled to the terminal processor 304, and configured to store various software programs and/or a plurality of sets of instructions. Specifically, the memory 312 may include a high-speed random access memory, and may further include a non-volatile memory, for example, one or more magnetic disk storage devices, flash memory devices, or other non-volatile solid-state storage devices. The memory 312 may store an operating system (briefly referred to as a system below), for example, an embedded operating system such as Android, iOS, Windows, or Linux. The memory 312 may further store a network communications program. The network communications program may be configured to communicate with one or more additional devices, one or more terminal devices, or one or more network devices. The memory 312 may further store a user interface program. The user interface program may use a graphical operation interface to visually display content of an application program, and use input controls such as a menu, a dialog box, and a key to receive a control operation of a user on the application program.

In some embodiments of this disclosure, the memory 312 may be configured to store a program for implementing, on a terminal 300 side, the signal transmission method according to one or more embodiments of this disclosure. For implementation of the signal transmission method according to one or more embodiments of this disclosure, refer to subsequent embodiments.

The terminal processor 304 may be configured to read and execute a computer-readable instruction. Specifically, the terminal processor 304 may be configured to invoke a program stored in the memory 312, for example, the program for implementing, on the terminal 300 side, the signal transmission method according to one or more embodiments of this disclosure, and execute an instruction included in the program.

It may be understood that the terminal 300 may be the terminal 203 in the wireless communications system 200 shown in FIG. 2, and may be implemented as a mobile device, a mobile station, a mobile unit, a wireless unit, a remote unit, a user agent, a mobile client, or the like.

It should be noted that the terminal 300 shown in FIG. 3 is merely an implementation of this embodiment of this disclosure. In an actual disclosure, the terminal 300 may alternatively include more or fewer components. This is not limited herein.

Figure 4:
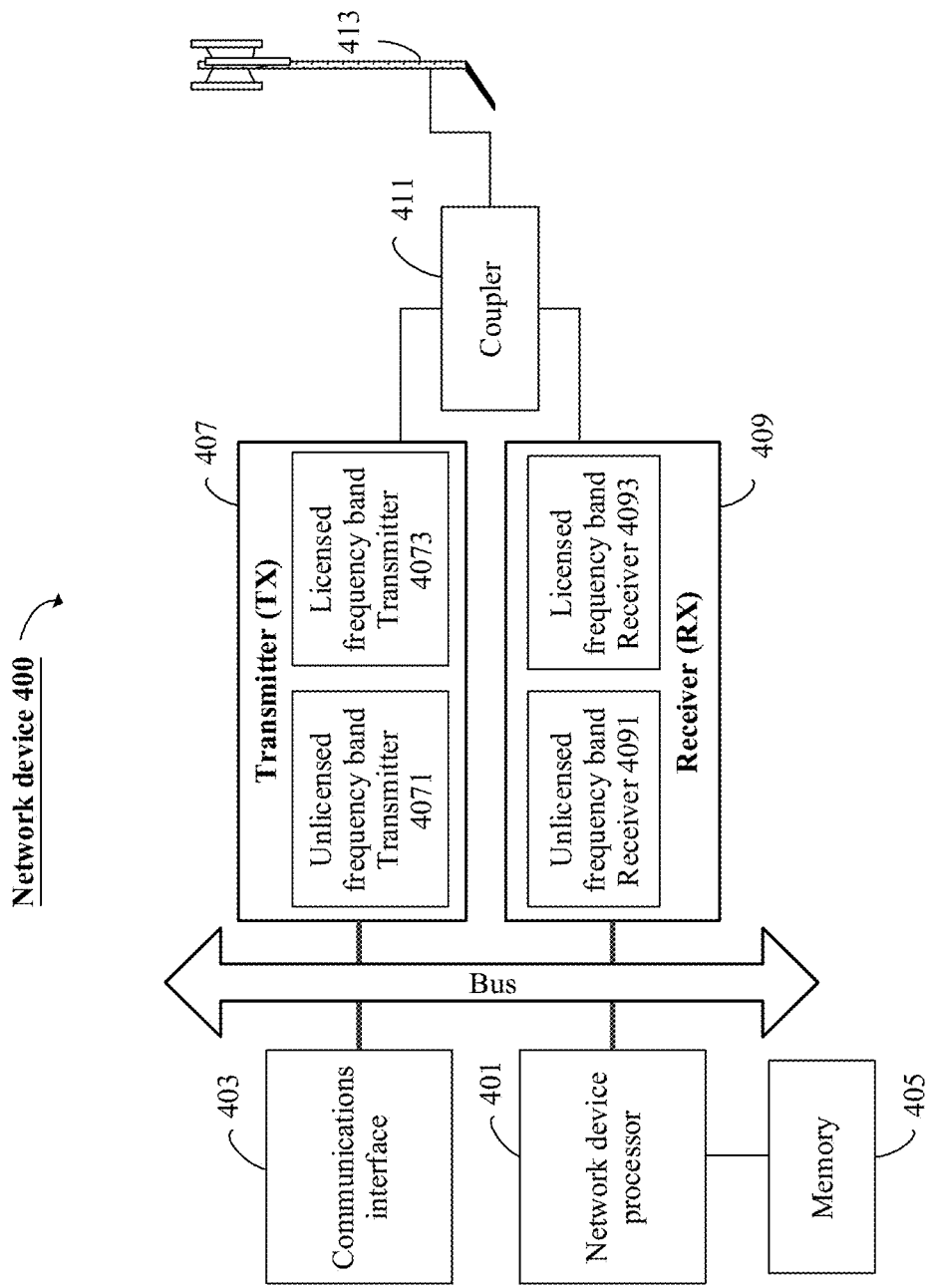
FIG. 4 is a schematic structural diagram of a network device according to this disclosure.

FIG. 4 shows a network device 400 according to some embodiments of this disclosure. As shown in FIG. 4, the network device 400 may include a communications interface 403, one or more network device processors 401, a transmitter 407, a receiver 409, a coupler 411, an antenna 413, and a memory 405. These components may be connected by using a bus or in another manner. In FIG. 4, an example in which the components are connected by using a bus is used.

A communications interface 403 may be used by the network device 400 to communicate with another communications device, for example, a terminal device or another base station. Specifically, the terminal device may be the terminal 300 shown in FIG. 3. Specifically, the communications interface 403 may include one or more of a global system for mobile communications (GSM) (2G) communications interface, a wideband code division multiple access (WCDMA) (3G) communications interface, a long term evolution (LTE) (4G) communications interface, and the like; or may be a 4.5G communications interface, a 5G communications interface, or a future new radio communications interface. The communications interface 403 is not limited to the wireless communications interface. A wired communications interface 403 may further be configured for the network device 400 to support wired communication. For example, a backhaul link between one network device 400 and another network device 400 may be a wired communication connection.

The antenna 413 may be configured to convert electromagnetic energy in a transmission line into an electromagnetic wave in free space, or convert an electromagnetic wave in free space into electromagnetic energy in a transmission line. The coupler 411 may be configured to divide a mobile communication signal into a plurality of signals, and allocate the plurality of signals to a plurality of receivers 409.

The transmitter 407 may be configured to transmit a signal output by the network device processor 401, for example, modulate the signal onto a licensed or unlicensed frequency band. In some embodiments of this disclosure, the transmitter 407 may include an unlicensed frequency band transmitter 4071 and a licensed frequency band transmitter 4073. The unlicensed frequency band transmitter 4071 may support the network device 400 in transmitting a signal on one or more unlicensed frequency bands, and the licensed frequency band transmitter 4073 may support the network device 400 in transmitting a signal on one or more licensed frequency bands.

The receiver 409 may be configured to receive a mobile communication signal received by the antenna 413. For example, the receiver 409 may demodulate a received signal that has been modulated onto an unlicensed or licensed frequency band. In some embodiments of this disclosure, the receiver 409 may include an unlicensed frequency band receiver 4091 and a licensed frequency band receiver 4093. The unlicensed frequency band receiver 4091 may support the network device 400 in receiving a signal that is modulated onto an unlicensed frequency band, and the licensed frequency band receiver 4093 may support the network device 400 in receiving a signal that is modulated onto a licensed frequency band.

In some embodiments of this disclosure, the transmitter 407 and the receiver 409 may be considered as a wireless modem. In the network device 400, there may be one or more transmitters 407 and one or more receivers 409.

The memory 405 is coupled to the network device processor 401, and configured to store various software programs and/or a plurality of sets of instructions. Specifically, the memory 405 may include a high-speed random access memory, and may further include a non-volatile memory, for example, one or more magnetic disk storage devices, flash memory devices, or other non-volatile solid-state storage devices. The memory 405 may store an operating system (briefly referred to as a system below), for example, an embedded operating system such as uCOS, VxWorks, or RTLinux. The memory 405 may further store a network communications program. The network communications program may be configured to communicate with one or more additional devices, one or more terminal devices, or one or more network devices.

The network device processor 401 may be configured to manage a radio channel, implement a call, establish and tear down a communications link, and control cross-cell handover of user equipment in a local control cell. Specifically, the network device processor 401 may include an administration module/communication module (AM/CM) (e.g., a center for speech channel switching and information exchange), a basic module (BM) (configured to implement call processing, signaling processing, radio resource management, radio link management, and a circuit maintenance function), a transcoder and submultiplexer (TCSM) (configured to implement multiplexing/demultiplexing and transcoding functions), and the like.

In this embodiment of this disclosure, the network device processor 401 may be configured to read and execute a computer-readable instruction. Specifically, the network device processor 401 may be configured to invoke a program stored in the memory 405, for example, a program for implementing, on a network device 400 side, the signal transmission method according to one or more embodiments of this disclosure, and execute an instruction included in the program.

It may be understood that the network device 400 may be the network device 201 in the wireless communications system 200 shown in FIG. 2, and may be implemented as a base transceiver station, a wireless transceiver, a basic service set (BSS), an extended service set (ESS), a NodeB, an eNodeB, or the like. The network device 400 may be implemented as several different types of base stations, for example, a macro base station and a micro base station. The network device 400 may apply different wireless technologies, for example, a cell radio access technology or a WLAN radio access technology.

It should be noted that the network device 400 shown in FIG. 4 is merely an implementation of this embodiment of this disclosure. In an actual disclosure, the network device 400 may alternatively include more or fewer components. This is not limited herein.

Based on the foregoing embodiments respectively corresponding to the wireless communications system 200, the terminal 300, and the network device 400, when uplink transmission is performed, to prevent an uplink data transmission channel (for example, a PUSCH) of a terminal from blocking channel listening (LBT) before a physical random access channel (PRACH) of another terminal, embodiments of this disclosure provide an uplink signal transmission method.

An inventive concept of this disclosure may include:

A first terminal reserves a first time interval (spacing) on an uplink data transmission channel (PUSCH). The first terminal does not send uplink data within the first time interval, and the first time interval is used by a second terminal to perform channel listening (LBT) before sending a random access preamble (RA preamble). In the embodiments of the present disclosure, for ease of description, the LBT performed before the RA preamble or a PRACH is named LBT_RA. Herein, the first time interval is related to one or more of a start moment (t1) at which the uplink data transmission channel of the first terminal arrives at a network device, an end moment (t2) at which the uplink data transmission channel of the first terminal arrives at the network device, a start moment (t3) at which the second terminal performs the channel listening, an end moment (t4) at which the second terminal performs the channel listening, duration ($T_{LBT}$) in which the second terminal performs the channel listening, and an uplink timing advance (TA) of the first terminal. The following separately describes the first time interval in different cases.

Figure 5:
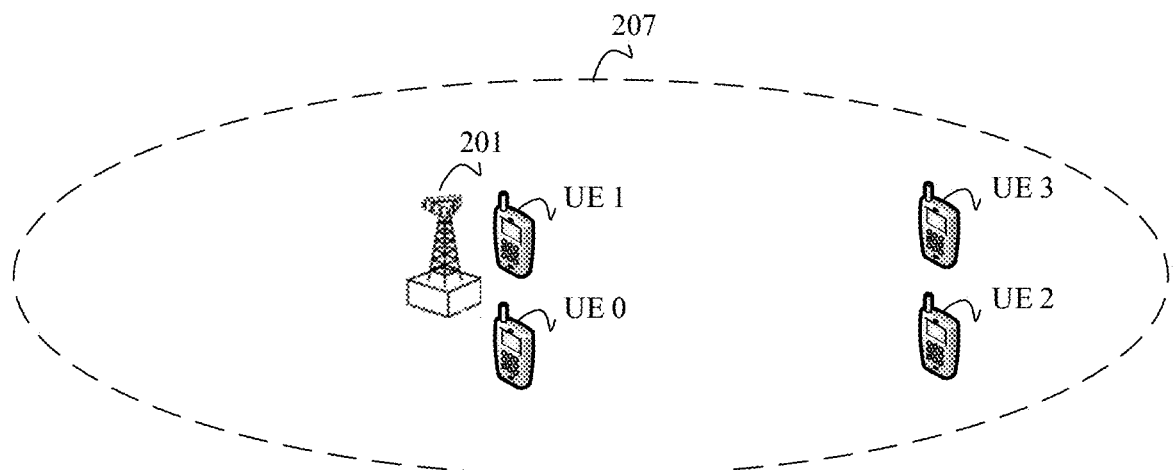
FIG. 5 is a schematic diagram of an application scenario according to this disclosure.

FIG. 5 is used as an example. It is assumed that the network device 201 is a base station, UE 1 and UE 2 are random access users, and UE 0 and UE 3 are successfully accessed users who have an uplink data transmission requirement. In terms of a location relationship, the UE 0 and the UE 1 are located in a cell center, and it is assumed that TAs of the UE 0 and the UE 1 are both 0, namely, TA0=TA1=0, to be specific, a path propagation delay between the base station and the UE 0 and a path propagation delay between the base station and the UE 1 are 0. The UE 2 and the UE 3 are located at a cell edge, and it is assumed that a path propagation delay between the UE 2 and the base station is the same as a path propagation delay between the UE 3 and the base station (because an uplink timing advance TA is equal to twice the path propagation delay, TAs of the UE 2 and the UE 3 are also the same, which are respectively denoted as a TA2 and a TA3, namely TA2=TA3). In addition, it is assumed that the UE 2 and the UE 3 are very close to each other (to be specific, a relative path propagation delay between the UE 2 and the UE 3 is 0). It can be learned that relative locations of the UE 0 to the UE 3 are representative, so that a critical case of impact (to be specific, lightest and heaviest impact) of blocking a PRACH of the cell center UE 1/cell edge UE 2 by a PUSCH of the cell center UE 0/cell edge UE 3 can be investigated. There-fore, a designed blocking avoidance method can be applicable to various cases of relative locations of users.

Figure 6A:
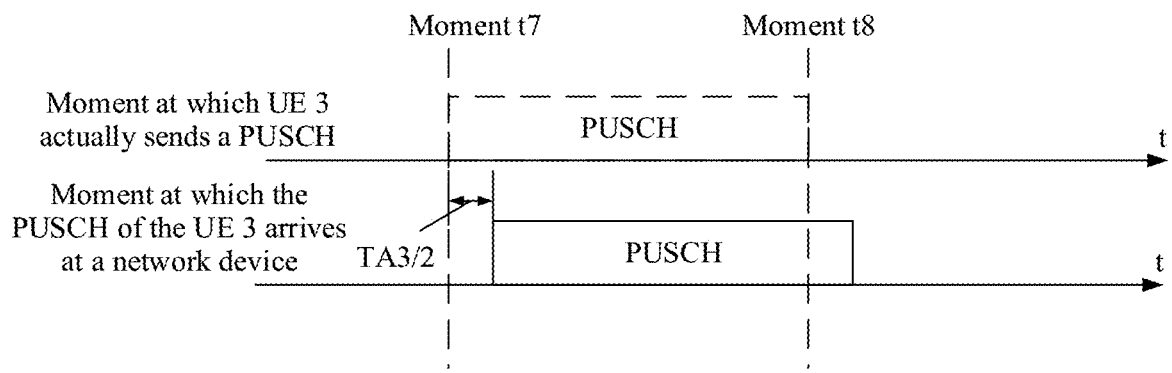
FIG. 6A is a schematic diagram of a moment at which a terminal sends a PUSCH and a moment at which the PUSCH of the terminal arrives at a network device according to this disclosure.

FIG. 6A is a schematic diagram of a moment at which a terminal sends a PUSCH and a moment at which the PUSCH of the terminal arrives at a network device. A moment t1 and a moment t2 are respectively a start moment and an end moment at which a PUSCH of the UE 3 arrives at the network device, and a moment t7 and a moment t8 are a start moment and an end moment at which the UE 3 actually sends the PUSCH. For example, locations that are allocated by the network device to the UE 3 for transmitting the PUSCH are a slot n and a slot n+1. Because a path propagation delay (½×TA3) exists between the UE 3 and the network device, the UE 3 transmits the PUSCH ½×TA3 in advance. In other words, the start moment t7 at which the UE 3 actually sends the PUSCH is equal to a start moment of the slot n minus ½×TA3, and the end moment t8 at which the UE 3 actually sends the PUSCH is equal to an end moment of the slot n+1 minus ½×TA3. The moments at which the PUSCH arrives at the network device are exactly the slot n and the slot n+1.

Figure 6B:
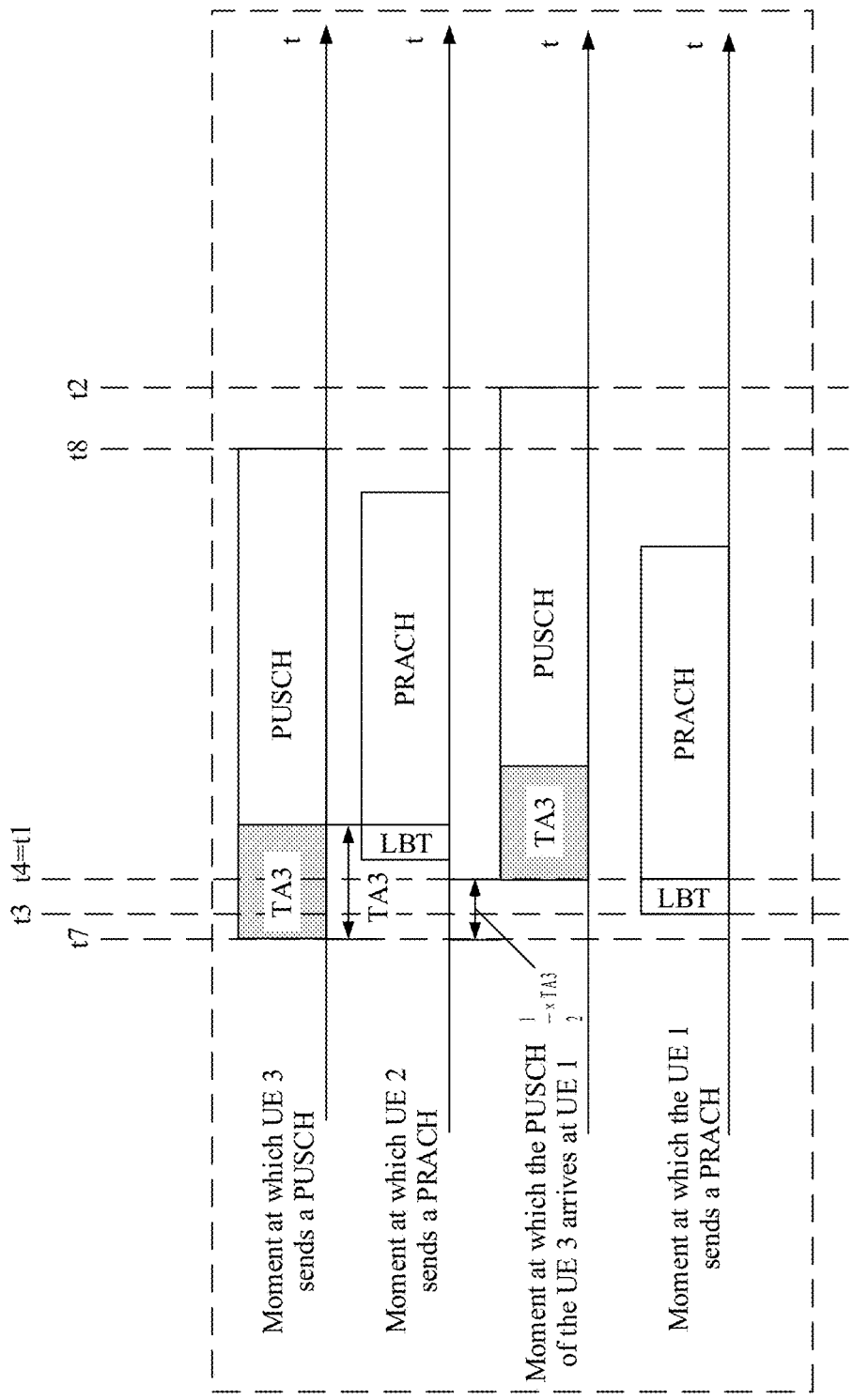
FIG. 6B is a schematic diagram of a manner of reserving a first time interval according to this disclosure.

FIG. 6B is a schematic diagram of a manner of reserving a first time interval according to this disclosure. In FIG. 6B, a case is considered in which for a PUSCH sent by the UE 3, the first time interval is reserved for another terminal to perform LBT_RA, and an example in which an end moment at which the UE 1 performs LBT_RA coincides with a start moment at which the PUSCH of the UE 3 arrives at the UE 1 is used for description. In FIG. 6B, it is assumed that a time period that is configured by the network device for the UE 3 for sending the PUSCH is t1 to t2 (for example, t1 to t2 corresponds to the slot n and the slot n+1). In other words, a time period in which the network device schedules data of the UE 3 is t1 to t2, where t1 is a start moment at which the PUSCH of the UE 3 arrives at the network device, and t2 is an end moment at which the PUSCH of the UE 3 arrives at the network device. Because the UE 3 is an edge user, and a path transmission delay between the UE 3 and the network device is ½×TA3, the UE 3 should start, ½×TA3 in advance, sending the PUSCH, to ensure that the time period in which the PUSCH of the UE 3 arrives at the network device is t1 to t2.

In this way, the start moment t7 at which the UE 3 actually sends the PUSCH is equal to t1−½×TA3, and the end moment t8 at which the UE 3 actually sends the PUSCH is equal to t2−½×TA3. It should be noted that a smaller value corresponding to the moment indicates an earlier time for sending the PUSCH. For time-domain units such as a slot or a symbol, a value of a moment should correspond to a slot or a symbol. It is assumed that a start moment of the LBT_RA that is set by the network device is t3, and an end moment of the LBT_RA (namely, a start moment at which the UE 1 sends a PRACH) is t4. In this case, because the UE 1 is a center user, and a path transmission delay between the UE 1 and the network device is 0, the start moment at which the UE 1 performs the LBT_RA is t3, and the end moment at which the UE 1 performs the LBT_RA is t4. In FIG. 6B, an example in which the moment t4 coincides with a moment t5 is used for description. In other words, the start moment at which the UE 1 sends the PRACH overlaps the start moment at which the PUSCH of the UE 3 arrives at the UE 1. Because the UE 2 is an edge user, a path transmission delay between the UE 2 and the network device is ½×TA2, and downlink timing of the UE 2 is used as a reference for a time at which the UE 2 performs LBT_RA. Therefore, a start moment at which the UE 2 performs the LBT_RA is equal to t7 plus TA3 minus $T_{LBT}$, and an end moment at which the UE 2 performs the LBT_RA is equal to t7 plus TA3. Herein, $T_{LBT}$ is duration required by UE to perform LBT. The UE 3 and the UE 2 are adjacent users, TA3=TA2, and a duration difference between downlink timing of the UE 3 and uplink sending of the PUSCH is TA3. Therefore, the start moment at which the UE 2 performs the LBT_RA is equal to t7 plus TA3 minus $T_{LBT}$, and the end moment at which the UE 2 performs the LBT_RA is equal to t7 plus TA3.

As shown in FIG. 6B, a time period in which the PUSCH sent by the UE 3 arrives at the UE 1 does not overlap a time period in which the UE 1 performs the LBT_RA. Therefore, only interference caused by the PUSCH of the UE 3 to LBT_RA of UE other than the UE 1 should be considered. For example, for the UE 2 that is closest to the UE 3, the UE 3 should reserve at least a time period TA3 to avoid impact on sending a PRACH by the UE 2 (to be specific, avoid interference to the LBT_RA performed by the UE 2). It is obvious that the reserved time period TA3 is also sufficient to avoid interference of the PUSCH of the UE 3 to LBT_RA of another user between the UE 1 and the UE 2. Therefore, when the start moment at which the UE 1 sends the PRACH coincides with the start moment at which the PUSCH of the UE 3 arrives at the UE 1, a start moment of the first time interval is t7, namely, the start moment at which the UE 3 sends the PUSCH, an end moment of the first time interval is t7+TA3, and duration of the first time interval is equal to TA3. In other words, a part TA3 at the beginning of the PUSCH of the UE 3 is reserved, and the UE 3 starts to send the PUSCH at a moment t7+TA3. The end moment of the first time interval may alternatively be replaced with t4+½× TA3. It should be noted that the first time interval is represented by a shadow part in FIG. 6B.

Figure 6C:
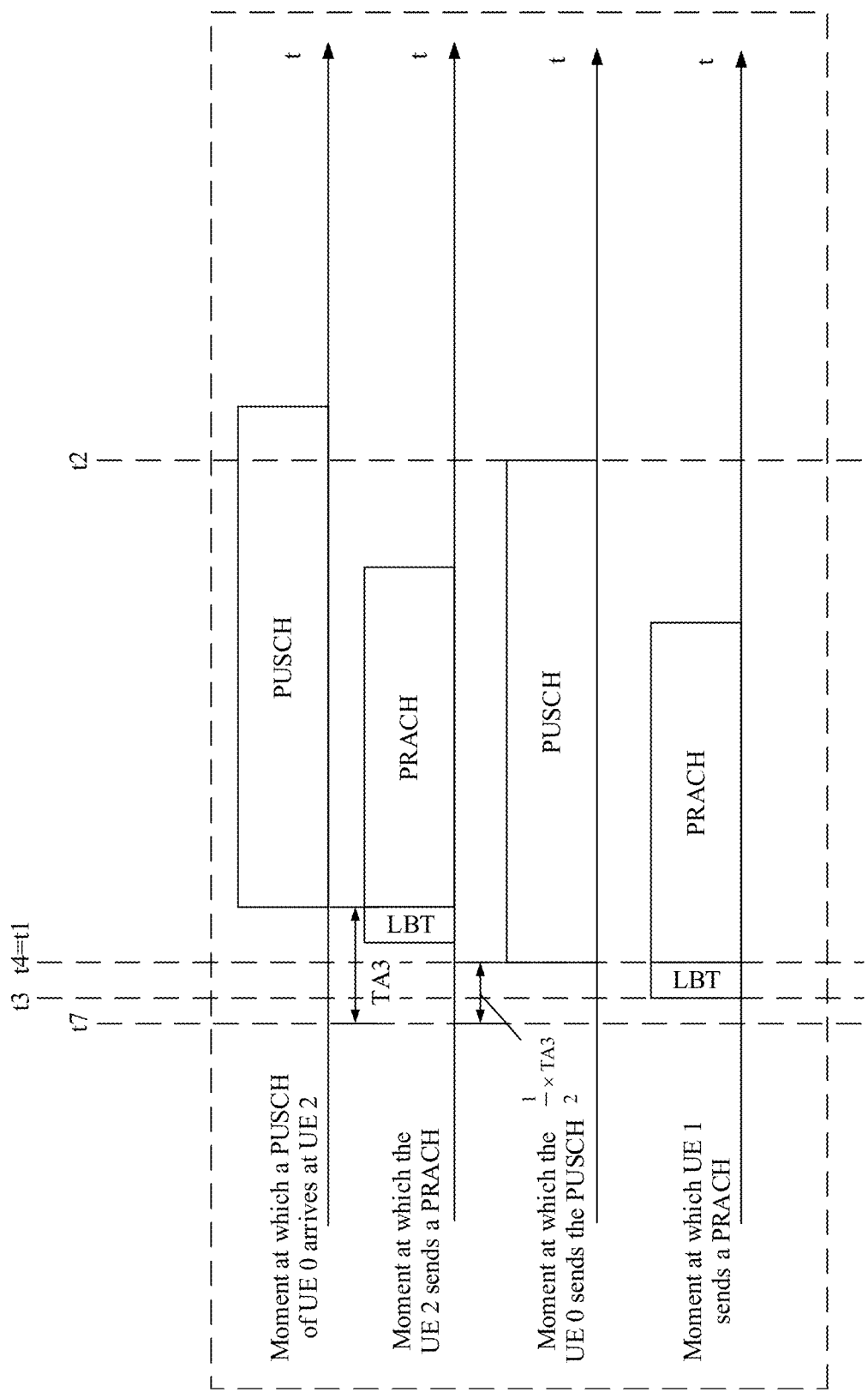
FIG. 6C is a schematic diagram of another manner of reserving a first time interval according to this disclosure.

FIG. 6C is a schematic diagram of another manner of reserving a first time interval according to this disclosure. In FIG. 6C, a case is considered in which for a PUSCH sent by the UE 0, the first time interval is reserved for another terminal to perform LBT_RA, and an example in which an end moment at which the UE 1 performs LBT_RA coincides with a start moment at which the PUSCH of the UE 0 arrives at the UE 1 is used for description. Because a path transmission delay of the UE 1 is 0, a start moment at which the UE 1 sends a PUSCH is t1, and an end moment at which the UE 1 sends the PUSCH is t2. In FIG. 6C, because a time period in which the UE 0 sends the PUSCH does not overlap a time period in which the UE 1 performs the LBT_RA, the PUSCH of the UE 0 does not interfere with the LBT_RA of the UE 1. In addition, a path transmission delay between the UE 0 and the UE 2 is ½×TA2, and a start moment at which the PUSCH of the UE 0 arrives at the UE 2 is equal to t1+½×TA2. Because a time period in which the PUSCH of the UE 0 arrives at the UE 2 does not overlap a time period in which the UE 2 performs LBT_RA, the PUSCH of the UE 0 does not interfere with the LBT_RA of the UE 2. Therefore, the UE 0 does not need to reserve the first time interval for another terminal. A reason why the UE 0 does not need to reserve the interval for another terminal may also be that a TA of the UE 0 is equal to 0. In this case, the interval reserved by the UE 0 for the another terminal is equivalent to 0.

It should be noted that in FIG. 6B and FIG. 6C, because the UE 1 is a terminal adjacent to the network device, and TA1=0, a time at which the UE 1 actually performs the LBT_RA is a time that is set by the network device and at which a terminal performs LBT_RA. Because the UE 2 is an edge user, a time at which the UE 2 actually performs the LBT_RA is not the time that is set by the network device and at which a terminal performs LBT_RA, but is a time that is set by the network device and at which a terminal performs LBT_RA plus a delay of ½×TA2. Unless otherwise specified, the start moment and the end moment of the LBT_RA that are described in this disclosure are a start moment and an end moment at which a terminal performs LBT_RA and that are set by the network device or stipulated in a protocol. Certainly, the start moment and the end moment of the LBT_RA may be deduced based on a start moment and an end moment at which a terminal sends a PRACH and that are set by the network device or stipulated in a protocol.

With reference to FIG. 6B and FIG. 6C, if the end moment at which the UE 1 performs the LBT_RA coincides with the start moment at which the PUSCH of the UE 0/UE 3 arrives at the UE 1, duration of the first time interval that should be reserved by the UE 0 is equal to the TA0, a start moment of the first time interval is equal to t1, and an end moment of the first time interval is equal to t1+TA0. The end moment of the first time interval may alternatively be replaced with t4+½×TA0. Duration of the first time interval that should be reserved by the UE 3 is equal to TA3, a start moment of the first time interval is equal to t7, and an end moment of the first time interval is equal to t7+TA3. The end moment of the first time interval may alternatively be replaced with t4+½× TA3. With reference to the cases in FIG. 6B and FIG. 6C, it may alternatively be equivalent to that the first terminal delays the transmission of the uplink data for the TA3 when sending the PUSCH, and reserves a part whose length is $T_{LBT}$ exactly before the PUSCH is sent for another terminal to perform LBT_RA; in other words, the terminal starts sending the PUSCH from the moment t4+½×TA3.

Figure 6D:
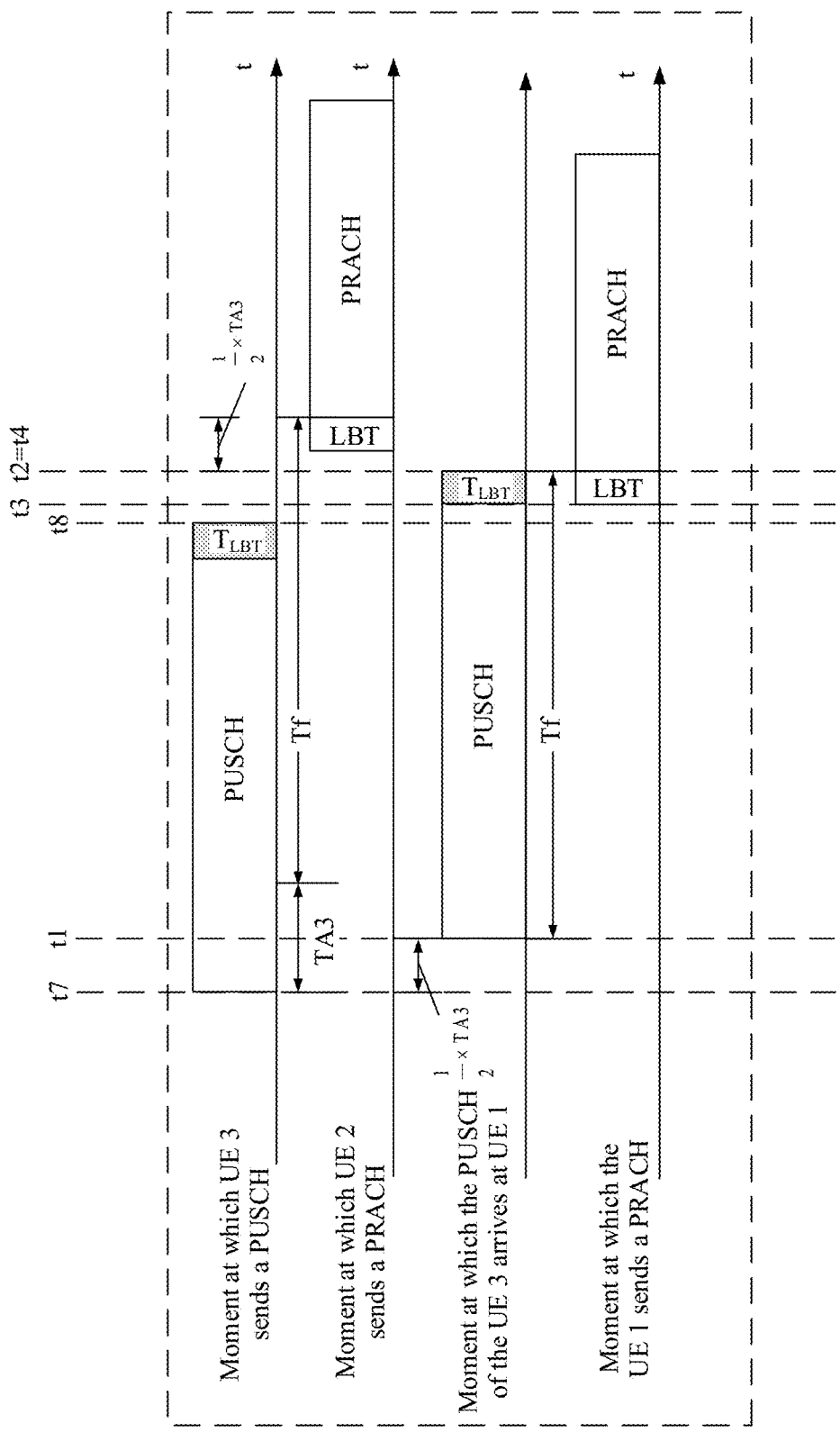
FIG. 6D is a schematic diagram of another manner of reserving a first time interval according to this disclosure.

FIG. 6D is a schematic diagram of another manner of reserving a first time interval according to this disclosure. In FIG. 6D, a case is considered in which for a PUSCH sent by the UE 3, the first time interval is reserved for another terminal to perform LBT_RA, and an example in which an end moment at which the UE 1 performs LBT_RA coincides with an end moment at which the PUSCH of the UE 3 arrives at the UE 1 is used for description. In FIG. 6D, because the end moment at which the UE 1 performs the LBT_RA coincides with the end moment at which the PUSCH of UE 3 arrives at the UE 1, the UE 3 should reserve a $T_{LBT}$ time period at the end of the PUSCH. Herein, $T_{LBT}$ refers to duration required by the UE 1 to perform the LBT_RA. In addition, because a time period in which the UE 2 performs LBT_RA does not overlap a time period in which the UE 3 sends the PUSCH, only interference caused by the PUSCH of the UE 3 to the LBT_RA performed by the UE 1 should be considered. In this case, duration of the first time interval is equal to $T_{LBT}$, a start moment of the first time interval is equal to t8−$T_{LBT}$, and an end moment of the first time interval is equal to t8. The start moment of the first time interval may alternatively be considered as t4−½×TA3−$T_{LBT}$, and the end moment of the first time interval may alternatively be considered as t4−½×TA3.

Figure 6E:
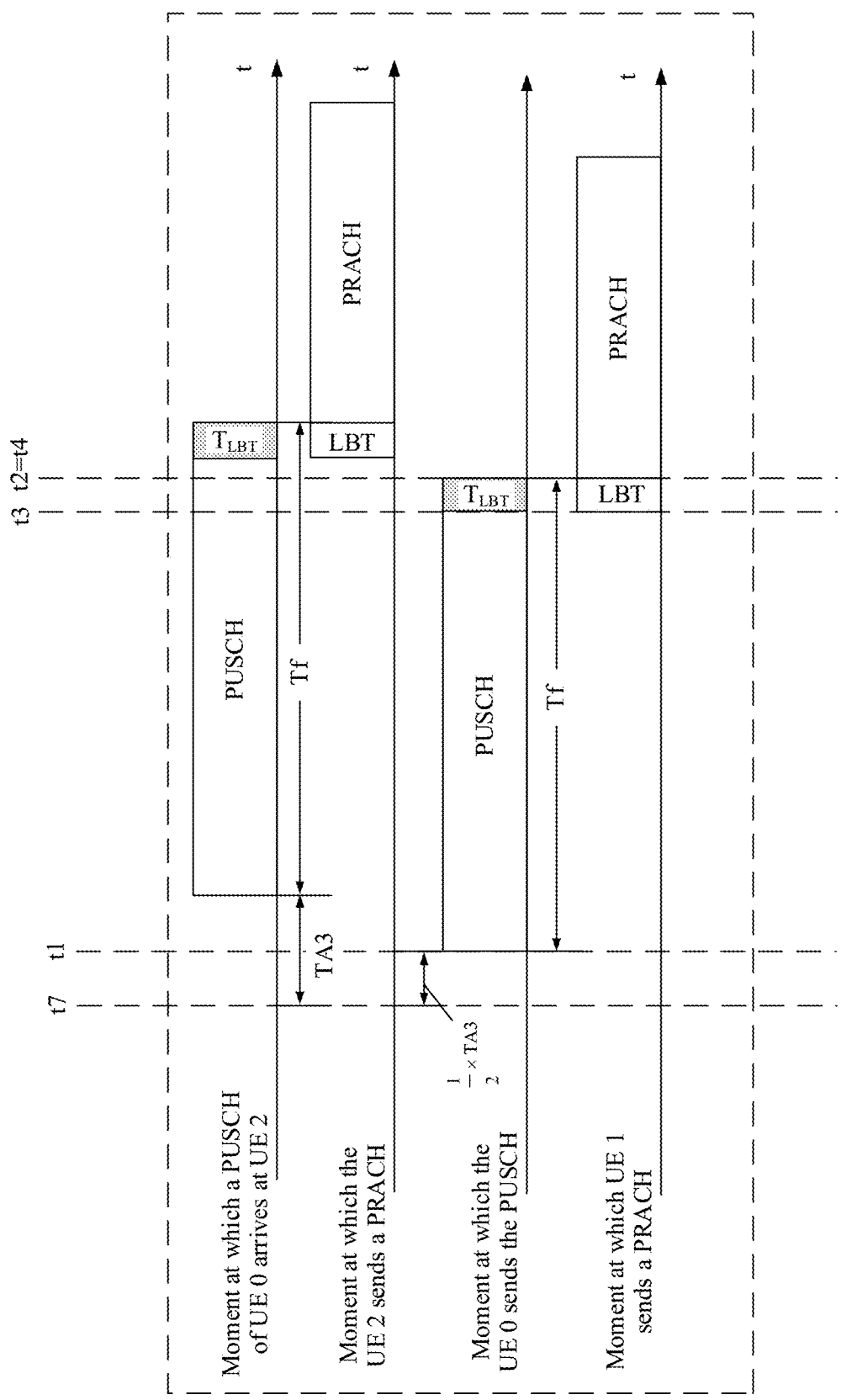
FIG. 6E is a schematic diagram of another manner of reserving a first time interval according to this disclosure.

FIG. 6E is a schematic diagram of another manner of reserving a first time interval according to this disclosure. In FIG. 6E, a case is considered in which for a PUSCH sent by the UE 0, the first time interval is reserved for another terminal to perform LBT_RA, and an example in which an end moment at which the UE 1 performs LBT_RA coincides with an end moment at which the UE 0 sends the PUSCH is used for description. In FIG. 6E, because a time period in which the UE 0 sends the PUSCH overlaps a time period in which the UE 1 performs the LBT_RA, and a path transmission delay between the UE 0 and the UE 2 is ½×TA2, a time period in which the PUSCH of the UE 0 arrives at the UE 2 also overlaps a time period in which the UE 2 performs LBT_RA. Therefore, the UE 0 should reserve the first time interval for the first time interval is equal to $t4-\frac{1}{2} \times TA0 - T_{LBT} = t4 - T_{LBT}$, and an end moment of the first time interval is equal to t4.

With reference to FIG. 6D and FIG. 6E, if the end moment at which the UE 1 performs the LBT_RA coincides with the end moment at which the PUSCH of the UE 0/UE 3 arrives at the UE 1, duration of the first time interval that should be reserved by the UE 0 is equal to $T_{LBT}$, a start moment of the first time interval is equal to $t4-\frac{1}{2} \times TA0 - T_{LBT}$, and an end moment of the first time interval is equal to $t4-\frac{1}{2} \times TA0$. Duration of the first time interval that should be reserved by the UE 3 is equal to $T_{LBT}$, a start moment of the first time interval is equal to $t4-\frac{1}{2} \times TA3 - T_{LBT}$, and an end moment of the first time interval is equal to $t4-\frac{1}{2} \times TA3$. For the cases in FIG. 6D and FIG. 6E, it may alternatively be equivalent to that the first terminal ends, $T_{LBT}$ in advance, the transmission of the uplink data when sending the PUSCH, to be specific, stops transmitting the PUSCH at the start moment of the first time interval, and reserves a part whose length is $T_{LBT}$ at the end of the PUSCH for another terminal to perform LBT_RA.

The foregoing cases in FIG. 6B to FIG. 6E are several special cases that are provided. The following describes, with reference to FIG. 6F to FIG. 6K, other cases of a time period in which the UE 1 performs LBT_RA and a time period in which the UE 3 sends a PUSCH.

Figure 6F:
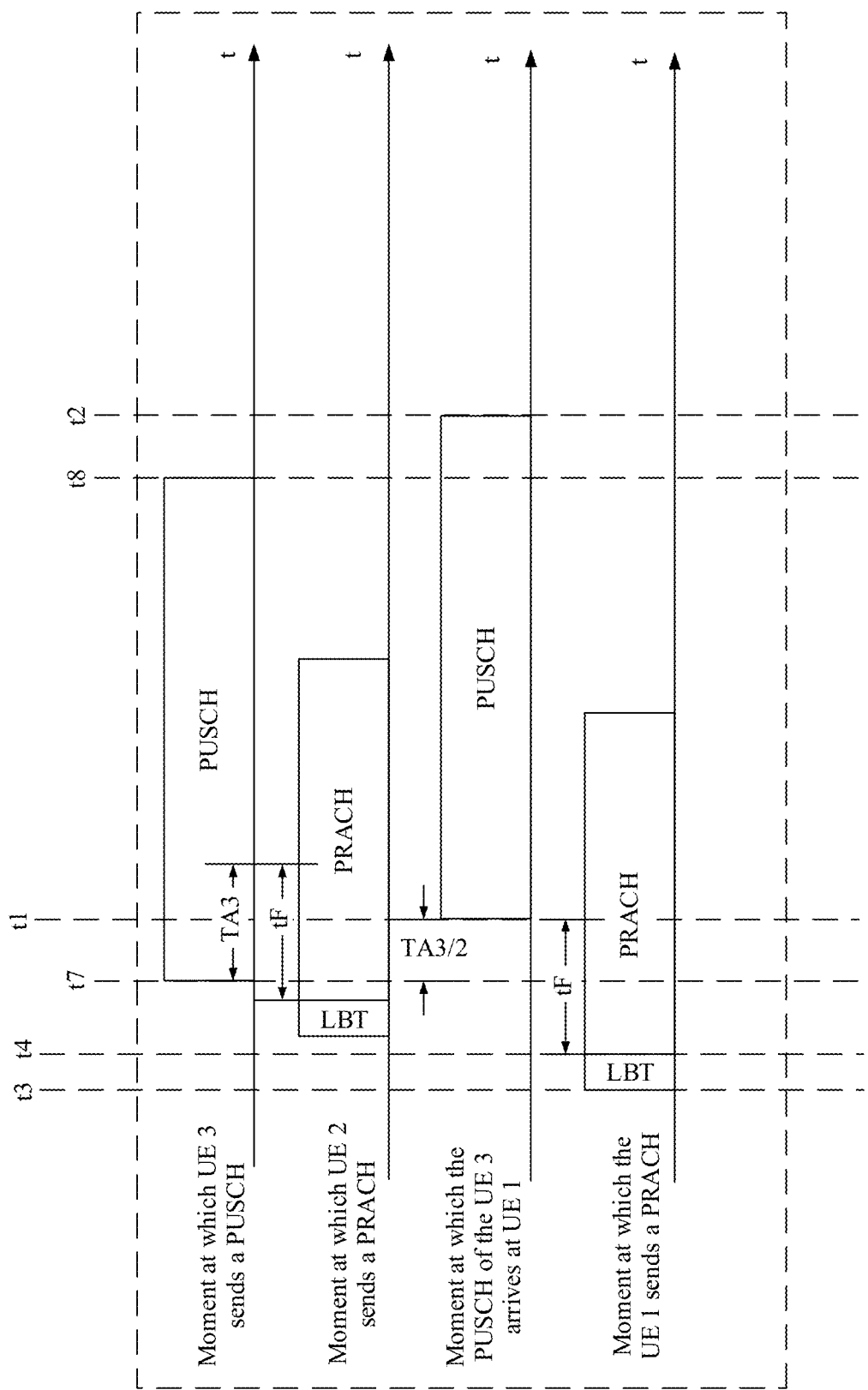
FIG. 6F is a schematic diagram of another manner of reserving a first time interval according to this disclosure.

Referring to FIG. 6F, if t1−t4=tF≥TA3, a PUSCH of the UE 3 does not interfere with LBT_RA of another terminal. Therefore, the UE 3 does not need to reserve the first time interval. Similarly, for the UE 0, TA0=0, and if t1−t4=tF≥0, a PUSCH of the UE 0 does not interfere with LBT_RA of another terminal. Therefore, the UE 0 does not need to reserve the first time interval.

Figure 6G:
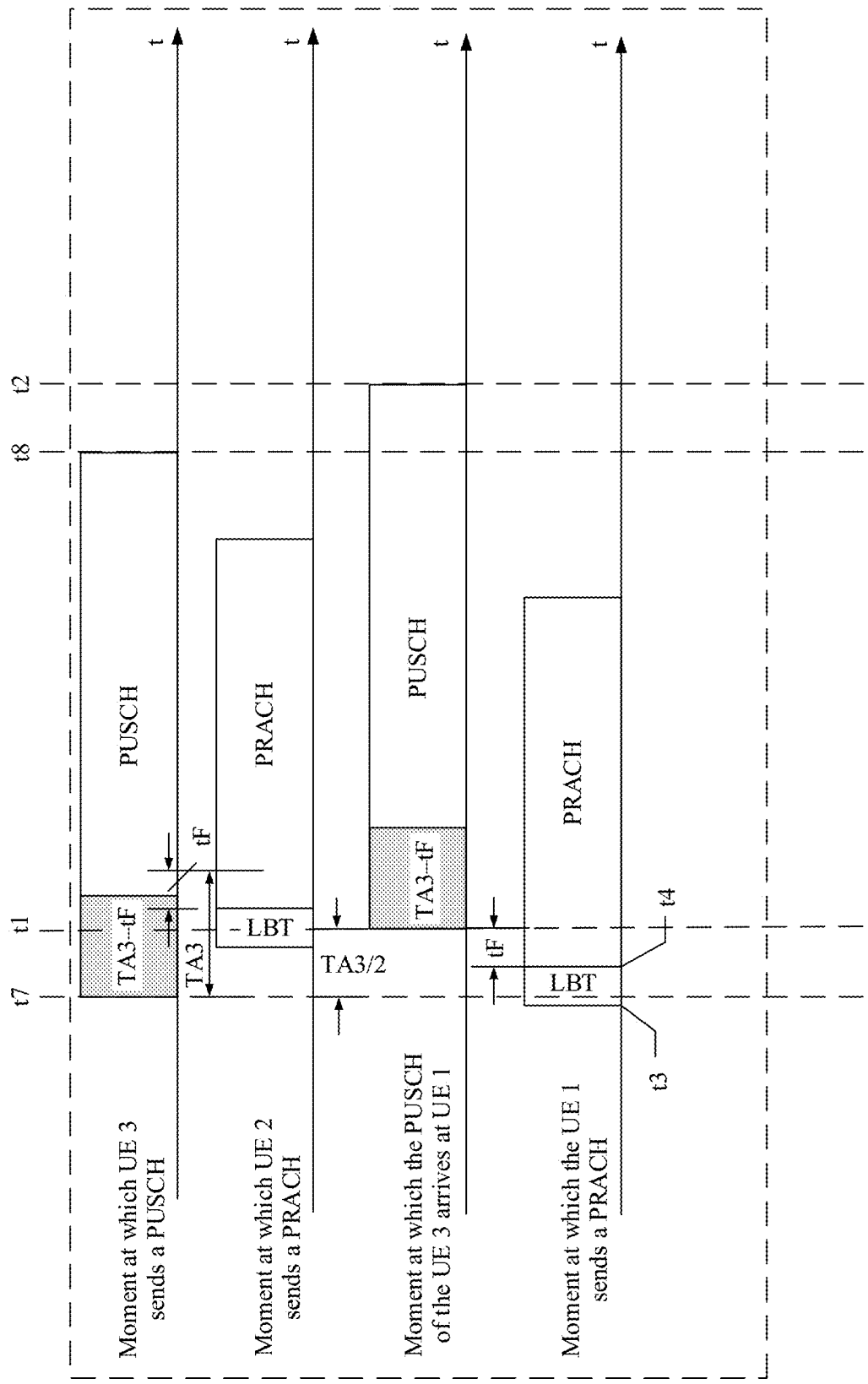
FIG. 6G is a schematic diagram of another manner of reserving a first time interval according to this disclosure.

Referring to FIG. 6G, if t1−t4=tF≥0 and tF<TA3, a PUSCH of the UE 3 interferes with LBT_RA of another terminal. Therefore, the UE 3 should reserve the first time interval. In addition, a start moment of the first time interval is t7, and an end moment of the first time interval is equal to $t4+\frac{1}{2} \times TA3$. FIG. 6B is a special case of FIG. 6G. To be specific, when t1−t4=tF=0, a start moment of the first time interval is $t7=t1-\frac{1}{2} \times TA3$, and an end moment of the first time interval is equal to $t4+\frac{1}{2} \times TA3$.

Figure 6H:
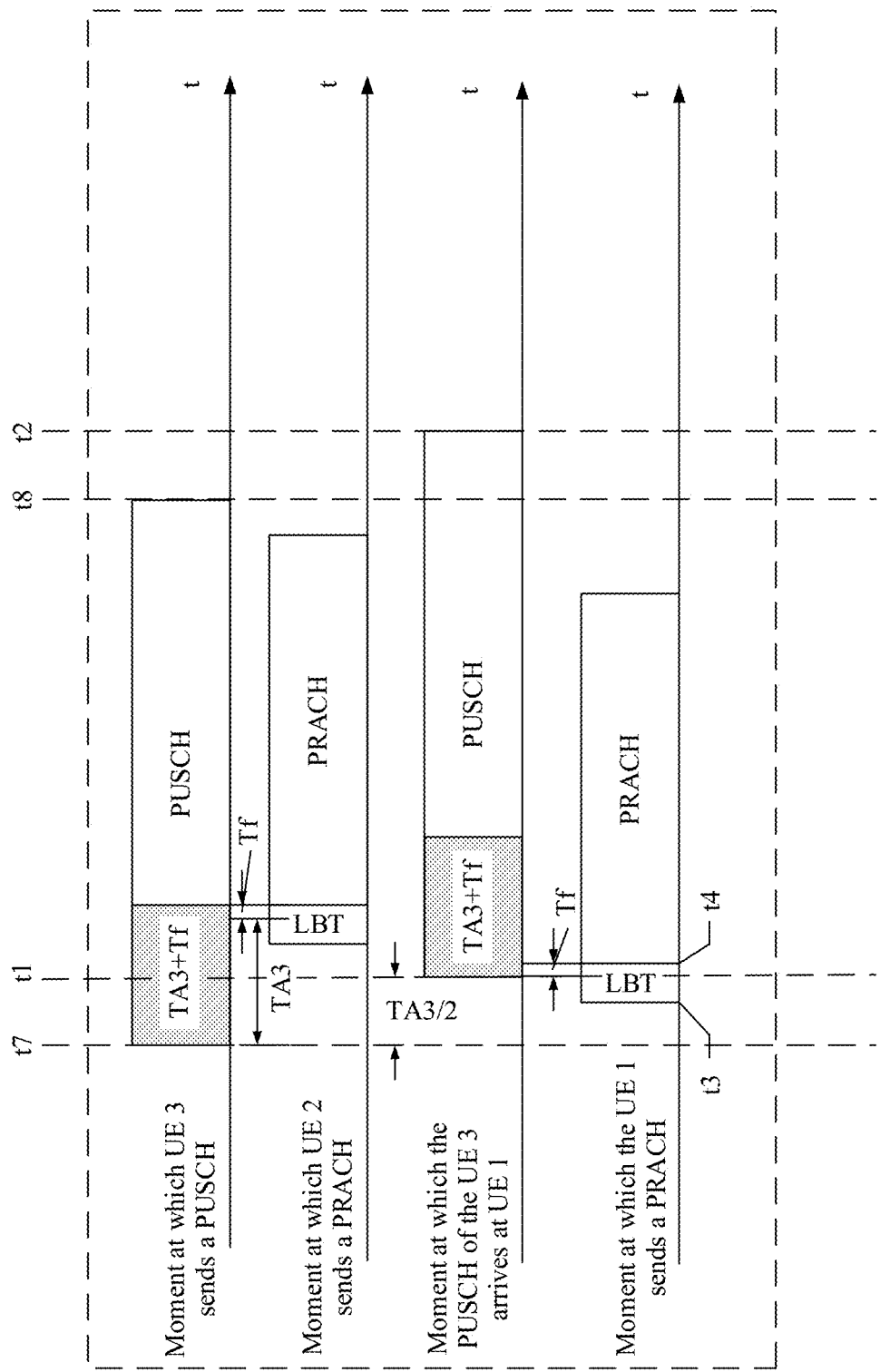
FIG. 6H is a schematic diagram of another manner of reserving a first time interval according to this disclosure.

Referring to FIG. 6H, if t4−t1=Tf and 0<Tf≤$T_{LBT}$, a PUSCH of the UE 3 interfere with LBT_RA of another terminal. Therefore, the UE 3 should reserve the first time interval. In addition, a start moment of the first time interval is t7, and an end moment of the first time interval is equal to $t4+\frac{1}{2} \times TA3$.

Figure 6I:
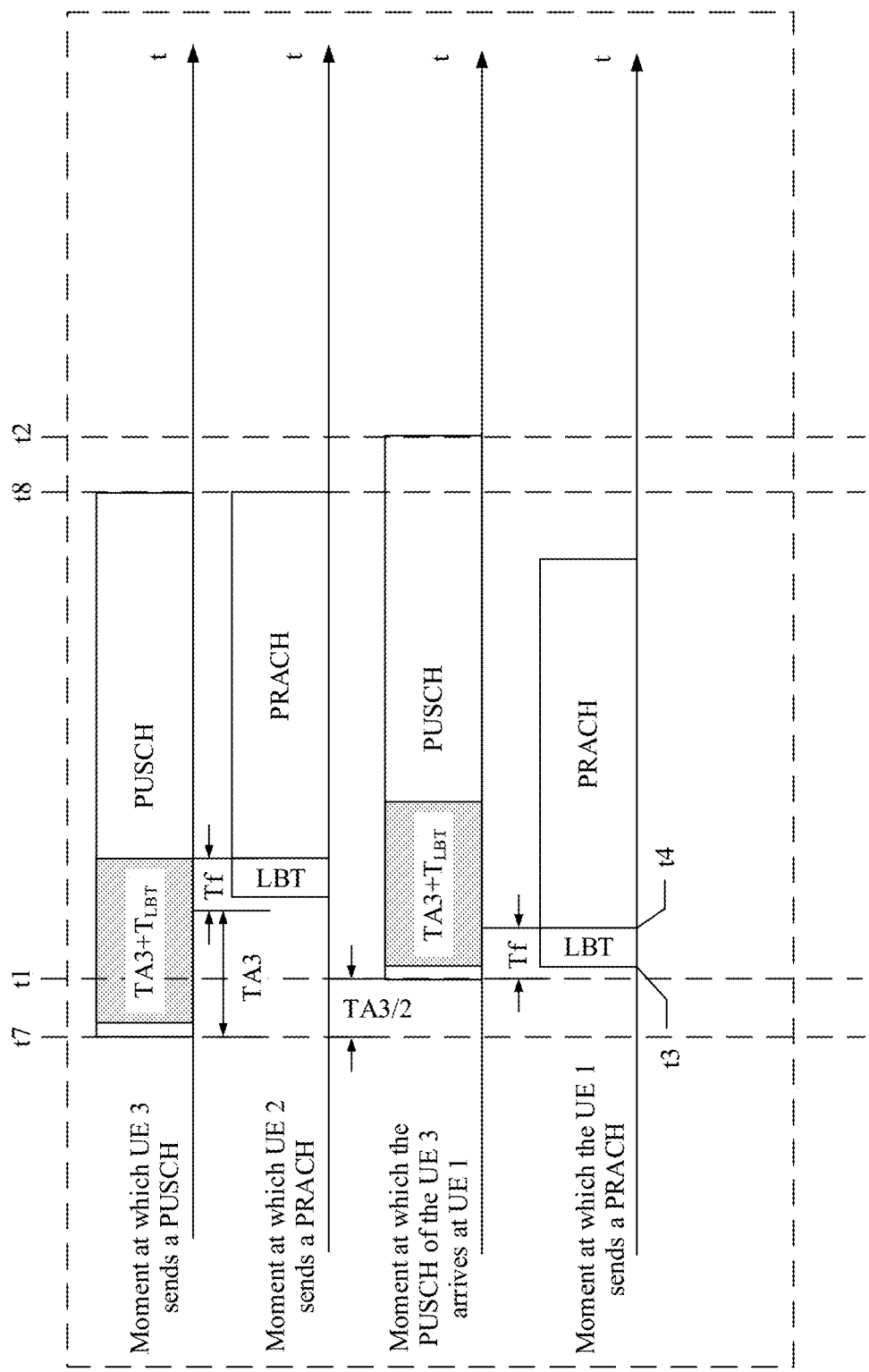
FIG. 6I is a schematic diagram of another manner of reserving a first time interval according to this disclosure.

Referring to FIG. 6I, if t4−t1=Tf and $T_{LBT}$<Tf≤$t2-t1-\frac{1}{2} \times TA3$, the UE 3 should reserve the first time interval. In addition, a start moment of the first time interval is $t4-\frac{1}{2} \times TA3 - T_{LBT}$, and an end moment of the first time interval is equal to $t4+\frac{1}{2} \times TA3$.

Figure 6J:
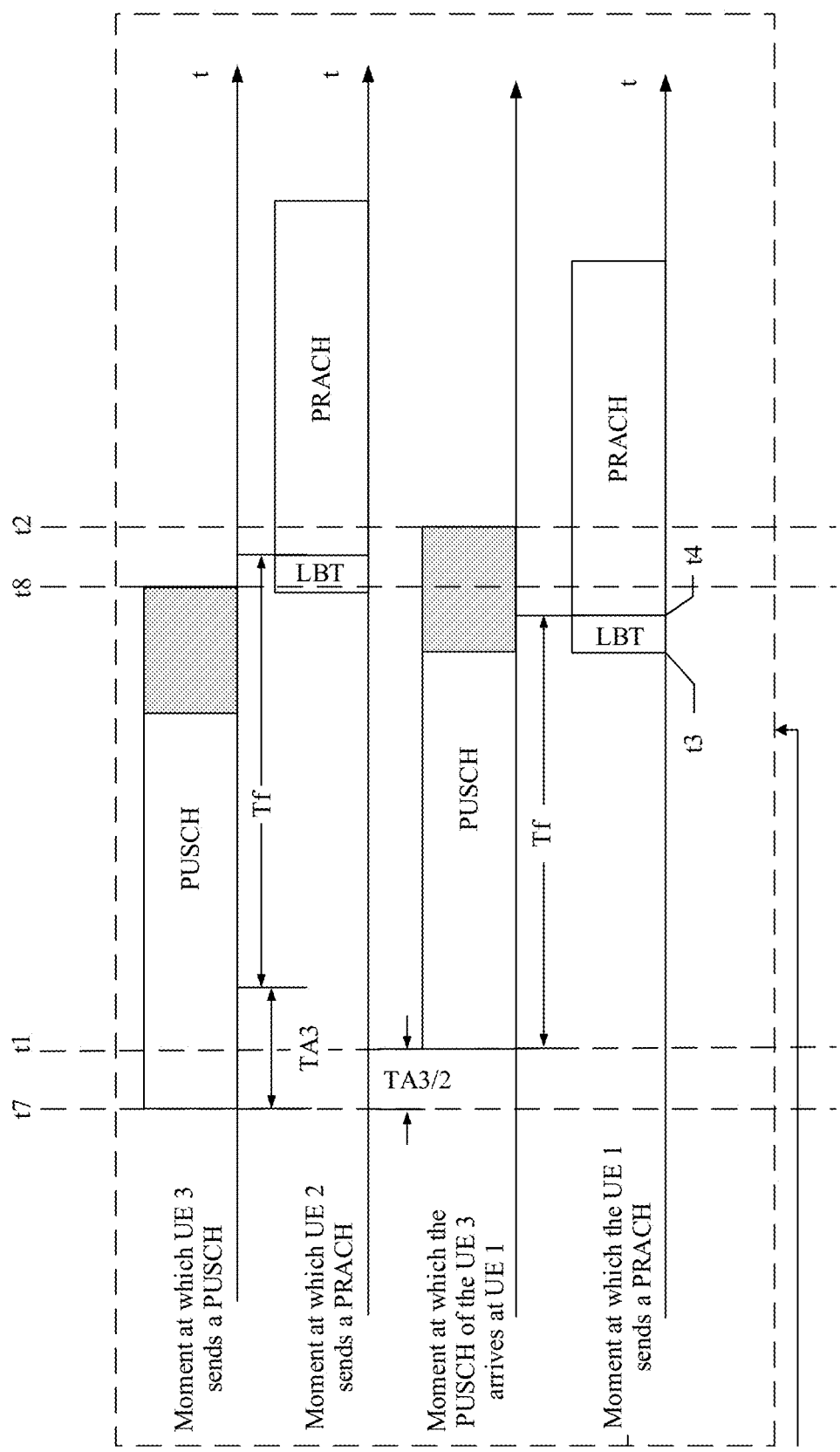
FIG. 6J is a schematic diagram of another manner of reserving a first time interval according to this disclosure.

Referring to FIG. 6J, if t4−t1=Tf and $t2-t1-\frac{1}{2} \times TA3 < Tf < t2-t1+T_{LBT}$, the UE 3 should reserve the first time interval. In addition, a start moment of the first time interval is $t4-\frac{1}{2} \times TA3 - T_{LBT}$, and an end moment of the first time interval is equal to $t8=t2-\frac{1}{2} \times TA3$. FIG. 6D is a special case of FIG. 6J. To be specific, when t4=t2, a start moment of the first time interval is $t4-\frac{1}{2} \times TA3 - T_{LBT}$, and an end moment of the first time interval is equal to $t8=t4-\frac{1}{2} \times TA3$.

Figure 6K:
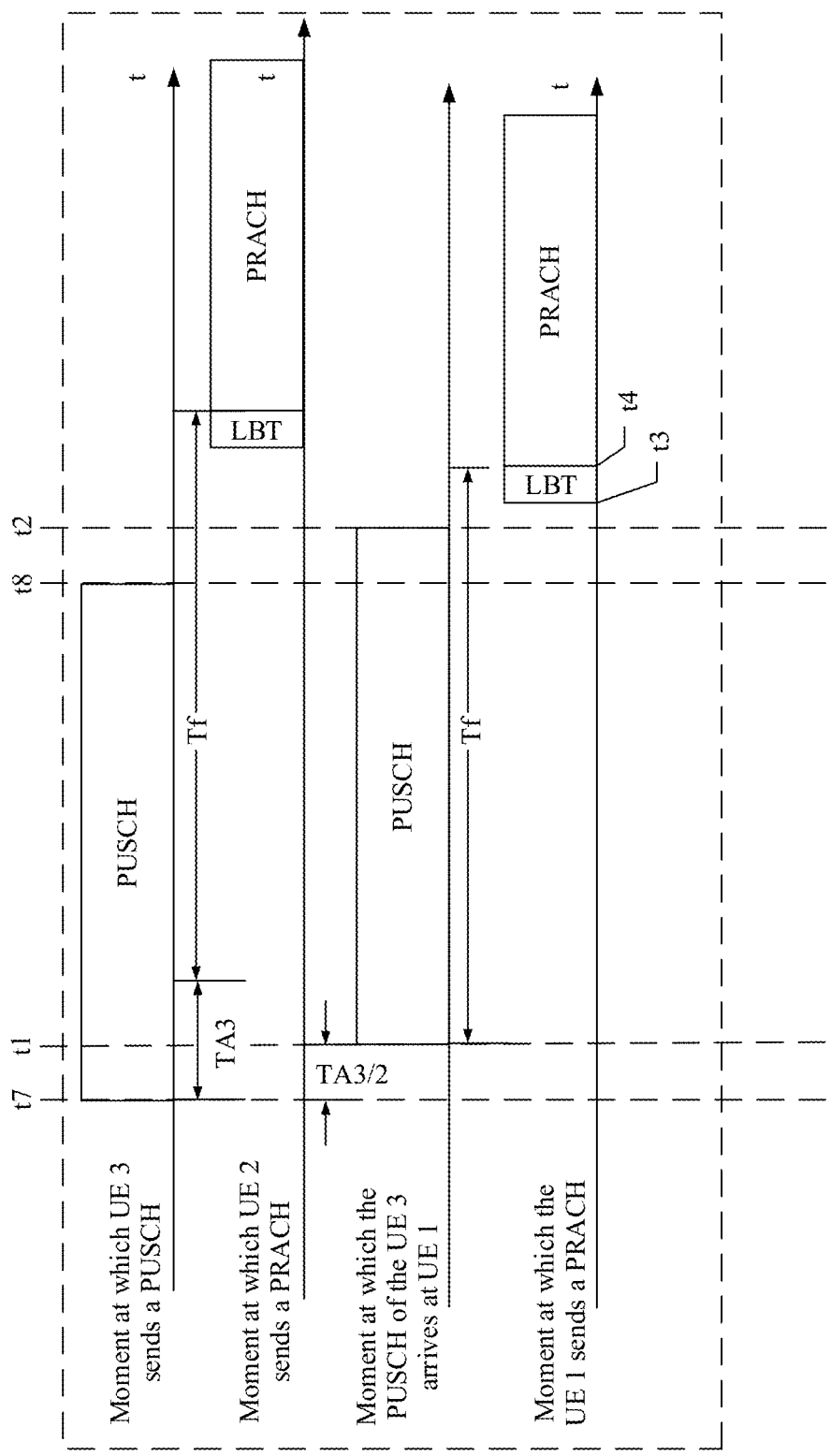
FIG. 6K is a schematic diagram of another manner of reserving a first time interval according to this disclosure.

Referring to FIG. 6K, if t4−t1=Tf and Tf≥$t2-t1+T_{LBT}$, the UE 3 does not need to reserve the first time interval.

Similarly, the UE 0 is also applicable to the conclusions obtained in FIG. 6F to FIG. 6K.

It should be noted that t3 and t4 may be time-domain locations that are determined by the network device and at which a terminal performs LBT_RA. After determining the time-domain locations, the network device notifies the time-domain locations of the LBT_RA or time-domain locations of PRACH slots to all terminals within a coverage area of the network device. Therefore, all the terminals within the coverage area may learn of, in time domain, locations at which LBT_RA may be performed or locations at which PRACHs are sent. Certainly, t3 and t4 may alternatively be stipulated in a protocol. In this case, the network device does not need to notify the terminal of the time-domain locations of the LBT_RA or time-domain locations of PRACH slots.

Figure 7A:
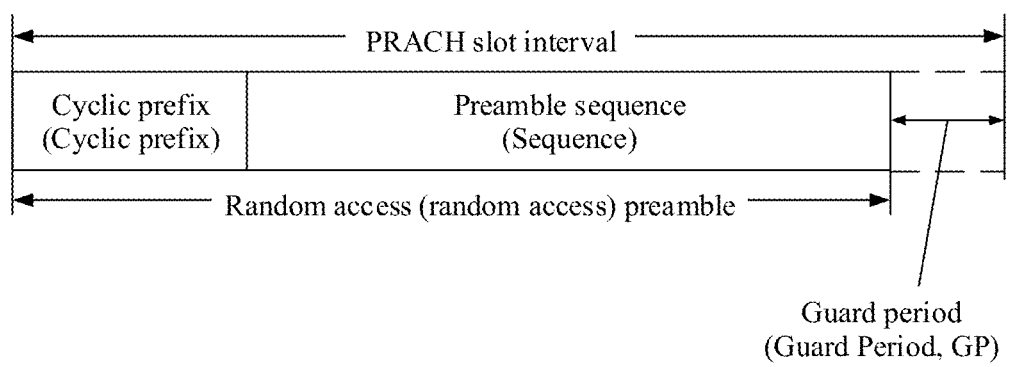
FIG. 7A is a schematic diagram of a format of a PRACH slot interval according to this disclosure.

FIG. 7A is a schematic diagram of a format of a PRACH slot interval. An RA preamble is sent within a PRACH slot interval on a PRACH. A format of the RA preamble usually includes a cyclic prefix (CP) and a preamble sequence. The preamble sequence may be an independent sequence, or may be repeated twice or more times for a sequence, or may be a combination of two or more sequences. Usually, a guard period (GP) is reserved at the end of the PRACH slot interval. A time of the GP TGP (Time of GP) is usually not greater than a time of the CP TCP (Time of CP), and a time of the preamble sequence (Time of Sequence, TSEQ) is usually much greater than the TCP. A smaller value between the TCP and the TGP determines a maximum cell radius to which the RA preamble is applicable. Functions of the CP and the GP may be understood as follows, when asynchronous random access is initiated, UE achieves only downlink clock synchronization, and an uplink clock difference caused by different distances between different UEs and a network side is not adjusted, preamble sequences of different UEs do not arrive at the network side at the same time, and consequently, interference between a plurality of users in a cell is caused. Therefore, the CP and the GP should be added before and after the RA preamble sequence to eliminate the interference between the users and avoid interference caused by a propagation delay to data transmission after the PRACH slot interval.

Figure 7B:
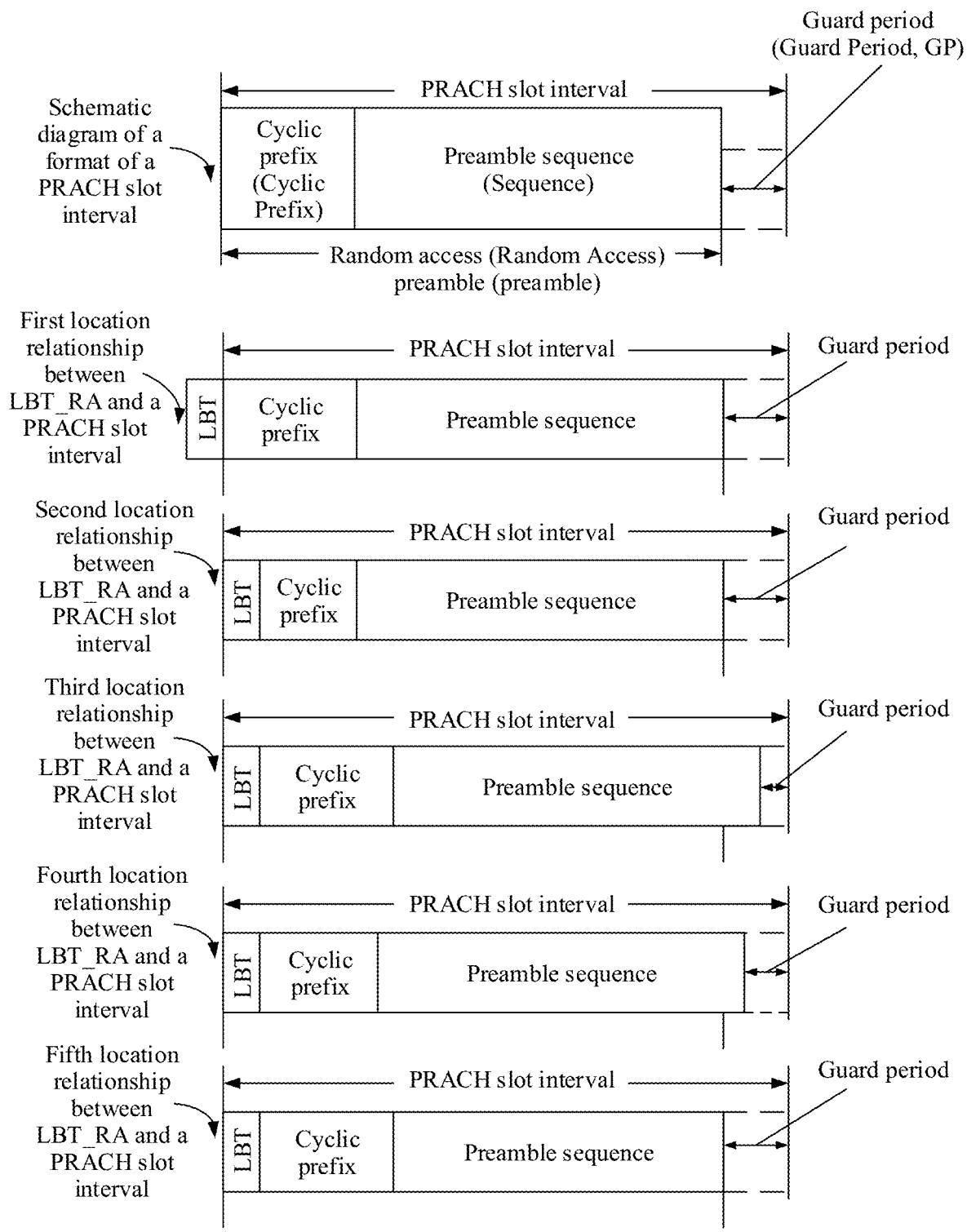
FIG. 7B is a schematic diagram of five location relationships between LBT before a PRACH and a PRACH slot interval according to this disclosure.

In this embodiment of the present disclosure, "LBT before a PRACH", namely, LBT_RA, is LBT performed before an RA preamble is sent. In an embodiment, LBT_RA is performed before a PRACH slot interval. In another embodiment, LBT_RA is performed within a PRACH slot interval. In both the cases, LBT_RA is performed before an RA preamble. Specifically, for a location relationship between the LBT_RA and the PRACH slot interval, refer to FIG. 7B. FIG. 7B shows five location relationships between LBT_RA and a PRACH slot interval in total. For the first location relationship, LBT_RA is performed before a PRACH slot interval, to be specific, the LBT_RA does not affect the PRACH slot interval and a structure of an RA preamble. In the second to the fourth location relationships, LBT_RA is performed within a PRACH slot interval. For the second location relationship, LBT_RA is performed in a CP in a PRACH slot interval. In this case, the LBT_RA occupies/compresses a length of the CP of an RA preamble, to be specific, the RA preamble is sent only after the LBT_RA succeeds. This case may also be equivalent to that the LBT_RA is performed within the PRACH slot interval and before the RA preamble. For the third location relationship, LBT_RA is performed within a PRACH slot interval and before an RA preamble. In this case, a length of a CP and a length of a preamble sequence remain unchanged, but a length of a GP is occupied/compressed. For the fourth location relationship, LBT_RA is performed within a PRACH slot interval and before an RA preamble. A length of a preamble sequence remains unchanged, and lengths of a CP and a GP are compressed (for example, the CP and the GP are shortened by $0.5^*T_{LBT}$ respectively, where $T_{LBT}$ refers to duration of the LBT performed before the RA preamble is sent). For the fifth location relationship, LBT_RA is performed within a PRACH slot interval and before an RA preamble. Lengths of a CP and a GP remain unchanged, and a length of a preamble sequence is compressed. For the first location relationship, a start moment of the LBT_RA is equal to a start position of the PRACH slot interval minus $T_{LBT}$, and an end moment of the LBT_RA is equal to a start position of the PRACH slot interval. For the second location relationship to the fifth location relationship, a start moment of the LBT_RA is equal to a start position of the PRACH slot interval, and an end moment of the LBT_RA is equal to a start position of the PRACH slot interval plus $T_{LBT}$.

Figure 8A:
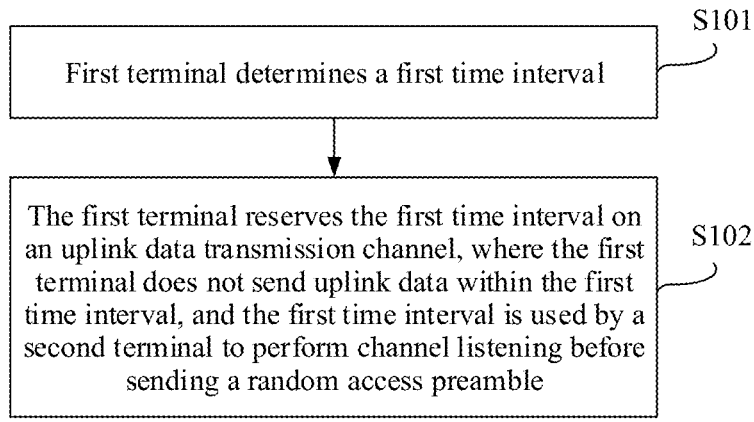
FIG. 8A is a schematic flowchart of an uplink signal transmission method according to this disclosure.

FIG. 8A is a schematic flowchart of an uplink signal transmission method according to this disclosure. The method includes but is not limited to the following blocks.

S101: A first terminal determines a first time interval.

In this embodiment of the present disclosure, in a first implementation, the first time interval is determined by a network device and sent to the first terminal. In a second implementation, the first time interval is determined by the first terminal. The two implementations are described in detail subsequently with reference to FIG. 8B and FIG. 8C.

S102: The first terminal reserves the first time interval on an uplink data transmission channel, where the first terminal does not send uplink data within the first time interval, and the first time interval is used by a second terminal to perform channel listening before sending a random access preamble.

In this embodiment of the present disclosure, the first time interval is determined by using one or more of the following parameters: a start moment (t1) at which the uplink data transmission channel arrives at the network device, an end moment (t2) at which the uplink data transmission channel arrives at the network device, a start moment (t3) at which the second terminal performs the channel listening, an end moment (t4) at which the second terminal performs the channel listening, duration ($T_{LBT}$) in which the second terminal performs the channel listening, and an uplink timing advance (TA) of the first terminal. Four cases of the first time interval are described with reference to FIG. 6G to FIG. 6J.

In a first case, referring to FIG. 6G, the first time interval is determined by using the following several parameters: the start moment (t1) at which the uplink data transmission channel arrives at the network device, the end moment (t4) at which the second terminal performs the channel listening, and the uplink timing advance (TA) of the first terminal. In this case, when a condition $0 \leq t1-t4 < TA$ is satisfied, it may be determined that a start moment (t5) of the first time interval is equal to $t1-\frac{1}{2} \times TA$ and an end moment (t6) of the first time interval is equal to $t4+\frac{1}{2} \times TA$.

In a second case, referring to FIG. 6H, the first time interval is determined by using the following several parameters: the start moment (t1) at which the uplink data transmission channel arrives at the network device, the end moment (t4) at which the second terminal performs the channel listening, the duration ($T_{LBT}$) in which the second terminal performs the channel listening, and the uplink timing advance (TA) of the first terminal. In this case, when a condition $0 < t4-t1 \leq T_{LBT}$ is satisfied, it may be determined that $t5 = t1-\frac{1}{2} \times TA$ and $t6 = t4+\frac{1}{2} \times TA$.

In a third case, referring to FIG. 6I, the first time interval is determined by using the following several parameters: the start moment (t1) at which the uplink data transmission channel arrives at the network device, the end moment (t2) at which the uplink data transmission channel arrives at the network device, the end moment (t4) at which the second terminal performs the channel listening, the duration ($T_{LBT}$) in which the second terminal performs the channel listening, and the uplink timing advance (TA) of the first terminal. In this case, when a condition $T_{LBT} < t4-t1 \leq t2-t1-\frac{1}{2} \times TA$ is satisfied, it may be determined that $t5 = t4-\frac{1}{2} \times TA - T_{LBT}$ and $t6 = t4+\frac{1}{2} \times TA$.

In a fourth case, referring to FIG. 6J, the first time interval is determined by using the following several parameters: the start moment (t1) at which the uplink data transmission channel arrives at the network device, the end moment (t2) at which the uplink data transmission channel arrives at the network device, the end moment (t4) at which the second terminal performs the channel listening, the duration ($T_{LBT}$) in which the second terminal performs the channel listening, and the uplink timing advance (TA) of the first terminal. In this case, when a condition $t2-t1-\frac{1}{2} \times TA < t4-t1 < t2-t1+T_{LBT}$, it may be determined that $t5 = t4-\frac{1}{2} \times TA - T_{LBT}$ and $t6 = t2-\frac{1}{2} \times TA$.

In some cases, the first terminal reserves the first time interval at the beginning of the uplink data transmission channel, to be specific, the first terminal delays sending the uplink data transmission channel. The reserved first time interval is used by another terminal to perform LBT_RA. In other words, the first terminal starts to transmit the PUSCH at the end moment of the first time interval.

In other cases, the first terminal reserves the first time interval at the end of the uplink data transmission channel, to be specific, the first terminal ends sending of the uplink data transmission channel in advance. The reserved first time interval is used by another terminal to perform LBT_RA. In other words, the first terminal stops transmitting the PUSCH at the start moment of the first time interval.

In some other cases, the first terminal reserves the first time interval in a middle part of the uplink data transmission channel. The reserved first time interval is used by another terminal to perform LBT_RA. In other words, the first terminal stops transmitting the PUSCH at the start moment of the first time interval, and continues to transmit the PUSCH at the end moment of the first time interval.

Optionally, the first time interval is determined by the network device and sent to the first terminal. This implementation is described with reference to FIG. 8B.

Figure 8B:
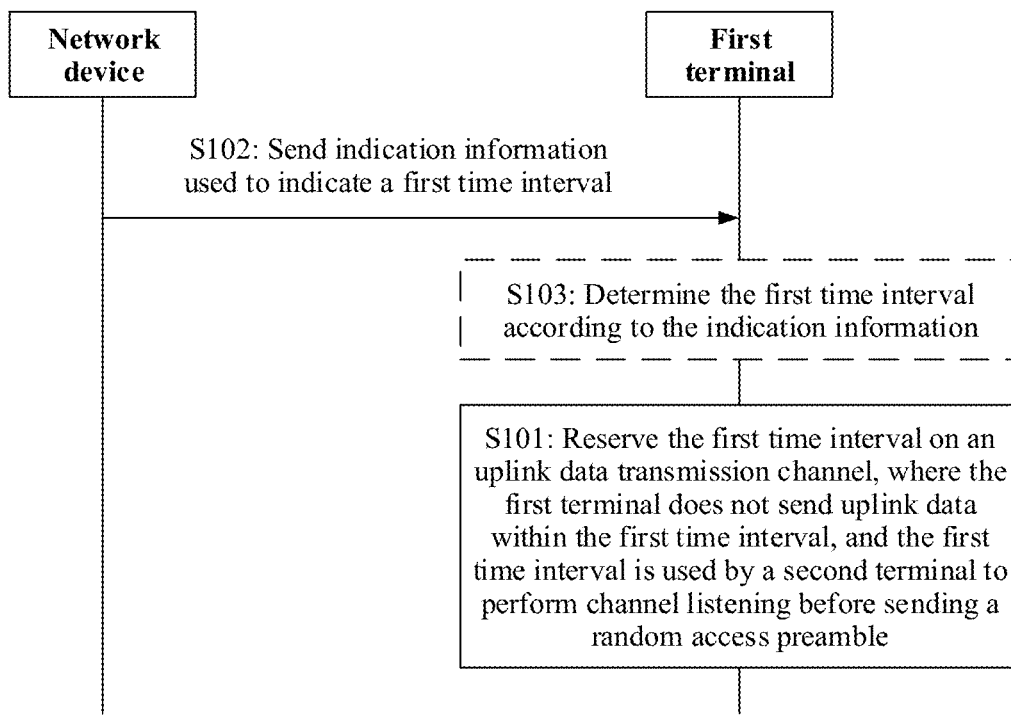
FIG. 8B is a schematic flowchart of another uplink signal transmission method according to this disclosure.

As shown in FIG. 8B, before block S101, the method further includes blocks S102 and S103.

S102: The network device sends, to the first terminal, indication information used to indicate the first time interval, and the first terminal receives the indication information sent by the network device.

In this embodiment of the present disclosure, the indication information may be used to indicate the start moment of the first time interval and the end moment of the first time interval; or the indication information may be used to indicate the start moment of the first time interval and duration of the first time interval; or the indication information may be used to indicate the end moment of the first time interval and duration of the first time interval. Alternatively, the indication information may be used to indicate a start symbol and/or a start slot of the first time interval and an end symbol and/or an end slot of the first time interval. Alternatively, the indication information may be used to indicate a start symbol and/or a start slot of the first time interval and duration of the first time interval. Alternatively, the indication information may be used to indicate an end symbol and/or an end slot of the first time interval and duration of the first time interval. To be specific, the network device may convert the first time interval into a location on a symbol and/or a slot. For these implementations, after receiving the indication information, the first terminal can directly learn of the first time interval.

For example, for the first case shown in FIG. 6G, the start moment of the first time interval is equal to the start moment at which the first terminal sends the uplink data transmission channel, and the end moment of the first time interval is equal to the end moment (t4) at which the second terminal performs the channel listening plus ½ multiplied by the uplink timing advance (TA) of the first terminal. In this way, the network device may directly send the start moment of the first time interval and the duration of the first time interval to the first terminal, so that the first terminal can directly learn of the first time interval. Alternatively, the network device sends, to the first terminal, slot and symbol locations that correspond to the start moment of the first time interval and the duration required for the first time interval, where the duration is Ceil((the end moment (t4) at which the second terminal performs the channel listening plus the uplink timing advance (TA) of the first terminal minus t1)/OS_length) OFDM symbols (where a Ceil operation indicates rounding up, and OS_length is an OFDM symbol length), so that the first terminal can directly learn of the first time interval. Alternatively, the network device sends the end moment of the first time interval and the duration of the first time interval to the first terminal, so that the first terminal can directly learn of the first time interval. Alternatively, the network device sends, to the first terminal, the end moment of the first time interval and the duration required for the first time interval, where the duration is Ceil((the end moment (t4) at which the second terminal performs the channel listening plus the uplink timing advance (TA) of the first terminal minus t1)/OS_length) OFDM symbols (where a Ceil operation indicates rounding up, and OS_length is an OFDM symbol length), so that the first terminal can directly learn of the first time interval. Alternatively, the network device may directly send the start moment of the first time interval and the end moment of the first time interval to the first terminal, so that the first terminal can directly learn of the first time interval.

If the network device and the terminal pre-negotiate the duration required for the first time interval, the indication information may alternatively be used to indicate only the start moment of the first time interval or the end moment of the first time interval.

Optionally, before performing block S102, the network device should first determine the first time interval.

In this embodiment of the present disclosure, for a manner in which the network device determines the start moment of the first time interval and the end moment of the first time interval, refer to the first case to the fourth case that are described in block S101. Details are not described herein again.

Optionally, the indication information may be notified by the network device to the first terminal by using signaling. Herein, the signaling may include but is not limited to downlink control information (DCI).

Optionally, a granularity of the first time interval may be a symbol, a slot, or a microsecond (μs).

Optionally, after block S102 and before block S101, the method further includes: determining, by the first terminal, the first time interval according to the indication information sent by the network device.

For example, for the embodiment shown in FIG. 6B or FIG. 6C, the network device may directly indicate a delay TA of a start location of the PUSCH of the first terminal, or instruct to abandon transmission of the first Ceil(TA/OS_length) OFDM symbols (where a Ceil operation indicates rounding up, and OS_length is an OFDM symbol length). The following Table 1 may further be designed for indication. In Table 1, it is assumed that one uplink slot includes 14 OFDM symbols, and 25 μs is equivalent to duration of one Cat2 LBT (it is assumed herein that LBT_RA performed by a terminal is Cat2 LBT). In Table 1, an index value "00" indicates that no interval is reserved, and transmission may start from the first symbol on the PUSCH. An index value "01" indicates that a TA is reserved, to be specific, a part TA at the beginning of the PUSCH is discarded and is not used for sending. An index value "10" indicates that (25+TA) μs is reserved, to be specific, (25+TA) μs at the beginning of the PUSCH is discarded and is not used for sending. An index value "11" indicates that an interval of one symbol is reserved, and transmission starts from the second symbol on the PUSCH. It should be noted that both the first terminal and the network device may store Table 1. The network device may directly send, to the first terminal, an index value used to indicate the first time interval, and the index value is the foregoing indication information. After receiving the index value, the first terminal queries, based on the index value, a record table shown in Table 1, to determine a start location, an end location, or duration of the first time interval that corresponds to the index value. For example, if the index value is 01, the first terminal may determine that the start location of the first time interval is a start location of the first symbol on the PUSCH, and the duration of the first time interval is equal to the TA of the first terminal. It should be noted that Table 1 refers to the first slot of the PUSCH by default. The TA is sent by the network device to the first terminal when the first terminal is in the random access process.

TABLE 1

| Index value | Start location of the PUSCH |
| --- | --- |
| 00 | Symbol 0 |
| 01 | TA in the symbol 0 |
| 10 | (25 + TA) μs in the symbol 0 |
| 11 | Symbol 1 |

For the embodiment shown in FIG. 6D or FIG. 6E, the network device may directly indicate an advance $T_{LBT}$ of an end location of the PUSCH of the first terminal, or instruct to abandon transmission of the last Ceil($T_{LBT}$/OS_length) OFDM symbols (where a Ceil operation indicates rounding up, and OS_length is an OFDM symbol length). The following Table 1 may further be designed for indication. In Table 1, it is assumed that one uplink slot includes 14 OFDM symbols, and 25 μs is equivalent to duration of one Cat2 LBT (it is assumed herein that LBT_RA performed by a terminal is Cat2 LBT). In Table 2, an index value "00" indicates that the PUSCH ends at an end moment of a symbol 13 (namely, the fourteenth symbol), to be specific, the PUSCH does not end in advance. An index value "11" indicates that the PUSCH ends at an end moment of a symbol 12 (namely, the thirteenth symbol), to be specific, the PUSCH ends one symbol in advance. An index value "01" indicates that the PUSCH ends 25 μs in advance before the end moment of the symbol 13. An index value "10" indicates that the PUSCH ends (25+TA) μs in advance before the end moment of the symbol 13. It should be noted that both the first terminal and the network device may store Table 2. The network device may directly send, to the first terminal, an index value used to indicate the first time interval. After receiving the index value, the first terminal queries, based on the index value, a record table shown in Table 2, to determine a start location and/or duration of the first time interval that correspond/corresponds to the index value. For example, if the index value is 01, the first terminal may determine that the start location of the first time interval is 25 µs before the end moment of the symbol 13 in the last slot of the PUSCH, and the duration of the first time interval is 25 µs. It should be noted that Table 2 refers to the last slot of the PUSCH by default.

TABLE 2

| Index value | End location of the PUSCH |
|---|---|
| 00 | Symbol 13 |
| 01 | −25 µs in the symbol 13 |
| 10 | −(25 + TA) µs in the symbol 13 |
| 11 | Symbol 12 |

It should be noted that, in addition to sending the index value to the first terminal, the network device further should send a table identifier to the first terminal. The table identifier is used to indicate whether the index value corresponds to the foregoing Table 1 or Table 2. After receiving the table identifier and the index value, the first terminal determines, based on the table identifier, whether the index value corresponds to the foregoing Table 1 or Table 2. After determining the table, the first terminal queries, from the determined table, the first time interval corresponding to the index value.

In the indication manners of querying Table 1 and Table 2, for a subcarrier spacing of 15 kHz, a maximum advance or delay offset is one OFDM symbol, and a length of the OFDM symbol is inversely proportional to the subcarrier spacing. However, duration of LBT performed on an unlicensed spectrum does not change due to a subcarrier change. Therefore, when a subcarrier spacing used for PUSCH transmission is relatively large (for example, the subcarrier spacing is no longer 15 kHz but 30 kHz or 60 kHz), maximum offsets in Table 1 and Table 2 may correspond to a length of at least one OFDM symbol. For example, when the subcarrier spacing changes from 15 kHz to 30 kHz, because the length of the OFDM symbol is halved, a possible variation of Table 1 is shown in Table 3. During implementation, an indication table of a start location and an indication table of an end location of a corresponding PUSCH may be defined for different subcarrier spacings (SCS), so that the network device may send a table identifier and an index value to the first terminal (for example, the network device sends the table identifier and the index value to the first terminal by using DCI signaling). After the first terminal receives the table identifier and the index value, a table is determined based on the table identifier. After determining the table, the first terminal queries, from the determined table, the first time interval corresponding to the index value. Therefore, the first terminal may learn, by querying the table, a corresponding advance or delay offset of the PUSCH. When the first terminal knows an SCS used for PUSCH transmission of the first terminal, the network device may not indicate the table identifier.

TABLE 3

| Index value | Start location of the PUSCH |
|---|---|
| 00 | Symbol 0 |
| 01 | TA in symbols 0 and 1 |
| 10 | (25 + TA) µs in the symbols 0 and 1 |
| 11 | Symbol 2 |

In the embodiment shown in FIG. 8B, the first terminal determines, based on signaling of the network device, whether to avoid and how long to avoid impact on the LBT before the PRACH, instead of actively avoiding, based on a location of a PRACH slot, the impact on the LBT before the PRACH. In this way, calculation overheads of the first terminal can be reduced, and an excessive waste of resources that is caused by active avoidance of the first terminal (for example, when a relatively large quantity of PRACH slots are configured in a network, but a relatively small quantity of users actually need to initiate uplink access) can be avoided.

Optionally, the first time interval may alternatively be determined by the first terminal. This implementation is described with reference to FIG. 8C.

Figure 8C:
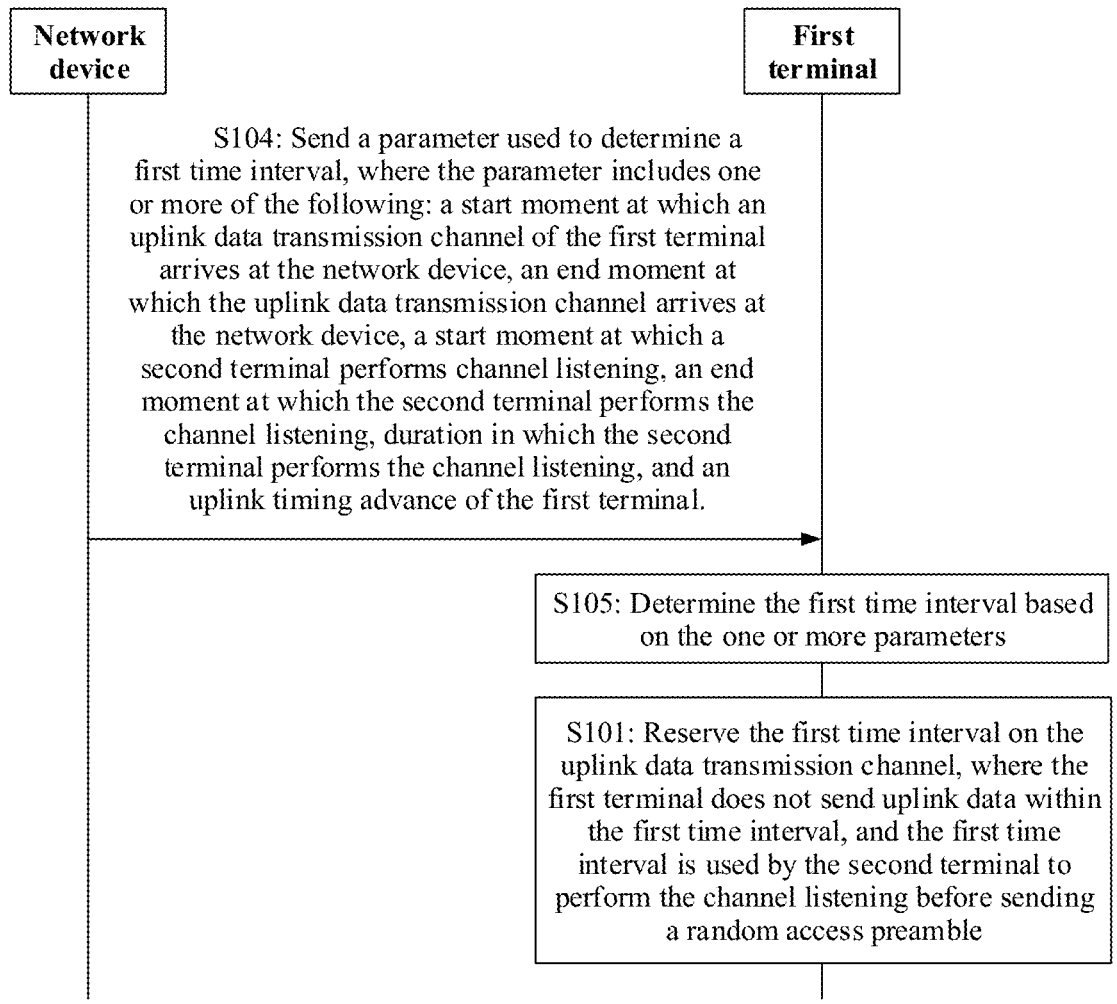
FIG. 8C is a schematic flowchart of another uplink signal transmission method according to this disclosure.

As shown in FIG. 8C, before block S101, the method further includes blocks S104 and S105.

S104: The network device sends, to the first terminal, a parameter used to determine the first time interval, where the parameter includes one or more of the following: the start moment at which the uplink data transmission channel of the first terminal arrives at the network device, the end moment at which the uplink data transmission channel arrives at the network device, a start moment for sending the random access preamble, the duration in which the second terminal performs the channel listening, and the uplink timing advance of the first terminal.

S105: The first terminal receives the one or more parameters from the network device. The first terminal determines the first time interval based on the one or more parameters.

In this embodiment of the present disclosure, for a manner in which the first terminal determines the start moment of the first time interval and the end moment of the first time interval, refer to the first case to the fourth case that are described in block S101. Details are not described herein again.

Optionally, the start moment at which the uplink data transmission channel arrives at the network device, the end moment at which the uplink data transmission channel arrives at the network device, the start moment for sending the random access preamble, the duration in which the second terminal performs the channel listening, and the uplink timing advance of the first terminal may be broadcast by the network device, or may be sent by the network device to the first terminal by using signaling.

Optionally, the signaling includes but is not limited to DCI signaling.

Optionally, a granularity of the first time interval may be a symbol, a slot, or a microsecond (µs).

Optionally, before the first terminal performs block S101, the network device further sends, to the first terminal, indication information used to indicate whether the interval should be reserved, and the indication information is used to indicate whether the first terminal should provide an avoidance time for another terminal to perform LBT_RA. The first terminal receives the indication information sent by the network device. If the indication information indicates that the interval should be reserved, the first terminal determines the start moment and the end moment of the first time interval based on the first case to the fourth case in block S101. If the indication information indicates that the interval does not need to be reserved, the first terminal does not need to reserve a time for another terminal. Specifically, the indication information may be notified to the first terminal by using signaling.

Optionally, a slot location used to send the PRACH may be configured by the network device through broadcasting. In this case, a plurality of users in a specific range (for example, different users in a coverage area of a base station) may learn of time-domain locations that can be used to send the PRACH.

In the embodiment shown in FIG. 8C, the first terminal may determine whether the uplink transmission of the first terminal affects LBT before another user sends a PRACH, and a manner in which the uplink transmission of the first terminal affects the LBT before the another user sends the PRACH, so that the first terminal can perform proper avoidance based on different cases in FIG. 6F to FIG. 6K. In this case, the network device further should notify the first terminal of a format of a PRACH slot interval (any format in FIG. 7B). To be specific, the first terminal is enabled to determine a relative location (before or within a PRACH slot) of LBT before the PRACH preamble is sent. If one LBT location is defined in a standard protocol by default, the network device does not need to notify the first terminal of the information. Specifically, the network device may notify the first terminal of the format of the PRACH slot interval by separately sending signaling or a broadcast message.

It should be noted that, the slot location used to send the PRACH may alternatively be dynamically configured by the network device for a specific user by using L1 control signaling. In this case, a user other than the user does not know the dynamically configured slot location used for PRACH transmission. Therefore, when scheduling the uplink transmission of the first terminal, the network device should further determine whether the uplink transmission of the first terminal interferes with one or some dynamically configured PRACH slots. If the uplink transmission of the first terminal interferes with one or some dynamically configured PRACH slots, the network device may notify, by using uplink scheduling grant signaling, the first terminal that performs the uplink transmission of the potentially interfered PRACH slot locations. A notification manner may be directly notifying a specific sequence number of the PRACH slot, or notifying a relative offset of the PRACH slot relative to an uplink PUSCH transmission slot (for example, the offset may be an absolute time interval, or may be a symbol offset using an OFDM symbol as a unit). The first terminal may alternatively actively avoid impact on LBT before the PRACH is sent in the dynamic PRACH slot.

The network device further should notify the first terminal of LBT_RA duration, for example, whether Cat 2 short LBT or Cat 4 long LBT is used. If one LBT type is defined in a standard protocol by default, the network device does not need to notify the first terminal of the information.

In the embodiment shown in FIG. 8C, the first terminal may alternatively actively avoid, based on the location of the PRACH slot, the impact on the LBT before the PRACH, thereby reducing signaling overheads.

Figure 9:
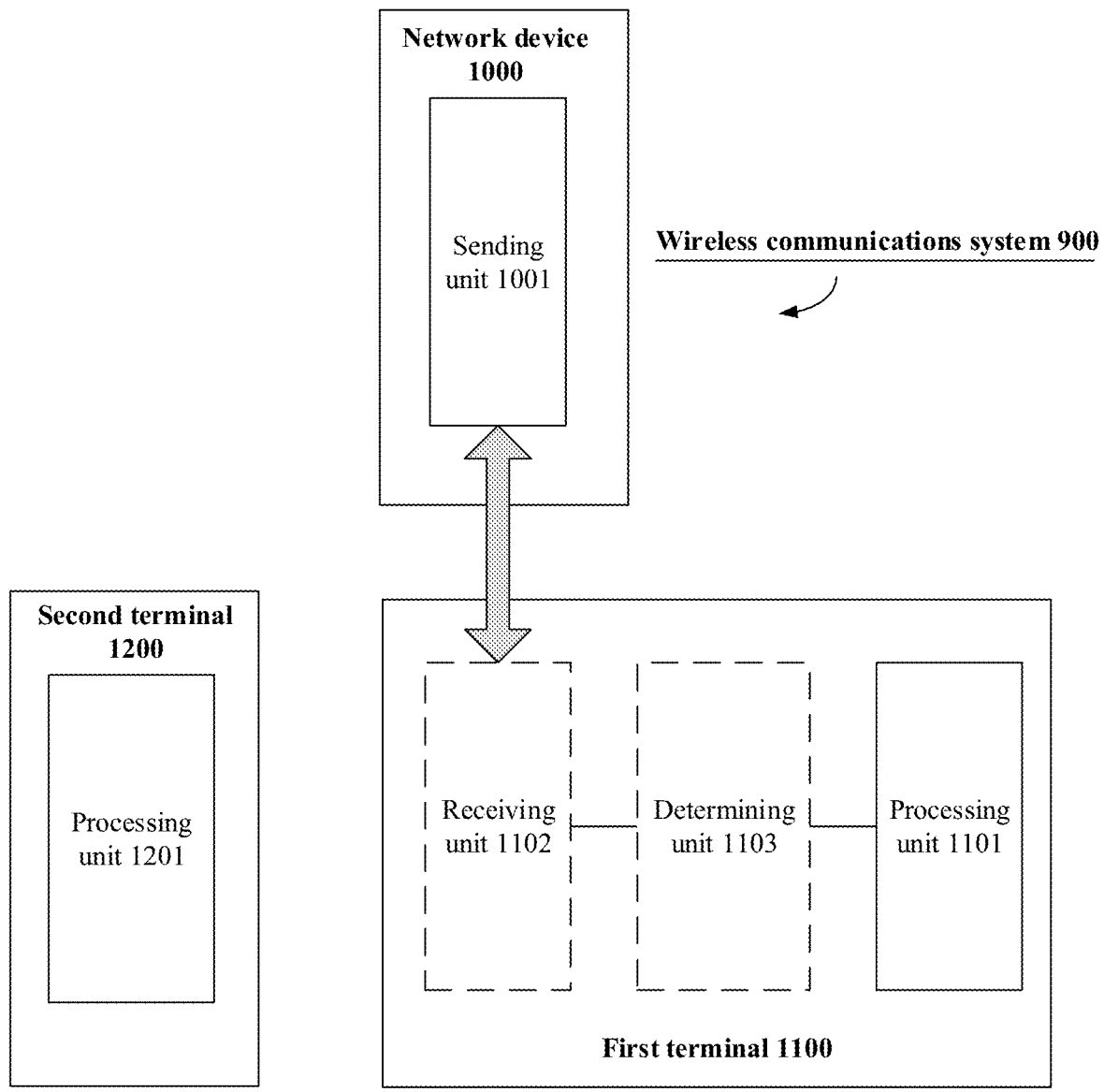
FIG. 9 is a schematic structural diagram of another wireless communications system according to this disclosure.

FIG. 9 shows a wireless communications system 900, and a network device 1000, a first terminal 1100, and a second terminal 1200 in the wireless communications system 900 according to an embodiment of this disclosure. The network device 1000 may be the network device in the foregoing method embodiment, and is configured to send indication information to the first terminal 1100. The first terminal 1100 may be the first terminal in the foregoing method embodiment, and is configured to reserve a first time interval on an uplink data transmission channel. The second terminal 1200 may be the second terminal in the foregoing method embodiment, and is configured to perform, within a first time interval reserved by the first terminal, channel listening (LBT) before a physical random access channel (PRACH).

As shown in FIG. 9, the network device 1000 may include a sending unit 1001.

The sending unit 1001 may be configured to send, to the first terminal 1100, indication information used to indicate the first time interval, where the first time interval is reserved by the first terminal on the uplink data transmission channel, the first terminal does not send uplink data within the first time interval, the first time interval is used by the second terminal to perform the channel listening before sending a random access preamble, and the first time interval is determined by using one or more of the following parameters:

a start moment (t1) at which the uplink data transmission channel arrives at the network device, an end moment (t2) at which the uplink data transmission channel arrives at the network device, a start moment (t3) at which the second terminal performs the channel listening, an end moment (t4) at which the second terminal performs the channel listening, duration ($T_{LBT}$) in which the second terminal performs the channel listening, and an uplink timing advance (TA) of the first terminal.

As shown in FIG. 9, the first terminal 1100 may include a processing unit 1101.

The processing unit 1101 may be configured to reserve the first time interval on the uplink data transmission channel, where the first terminal does not send uplink data within the first time interval, the first time interval is used by the second terminal to perform the channel listening before sending a random access preamble, and the first time interval is determined by using one or more of the following parameters:

a start moment (t1) at which the uplink data transmission channel arrives at the network device, an end moment (t2) at which the uplink data transmission channel arrives at the network device, a start moment (t3) at which the second terminal performs the channel listening, an end moment (t4) at which the second terminal performs the channel listening, duration ($T_{LBT}$) in which the second terminal performs the channel listening, and an uplink timing advance (TA) of the first terminal.

Optionally, the first terminal 1100 may further include:

a receiving unit 1102, configured to: before the processing unit 1101 reserves the first time interval on the uplink data transmission channel, receive indication information that is of the first time interval and that is sent by the network device, where the indication information is used to indicate a start moment of the first time interval and an end moment of the first time interval; or the indication information is used to indicate an start moment of the first time interval and duration of the first time interval; or the indication information is used to indicate an end moment of the first time interval and duration of the first time interval; and a determining unit 1103, configured to determine the first time interval according to the indication information.

Optionally, the first terminal 1100 may further include:

a receiving unit 1102, configured to: before the processing unit 1101 reserves the first time interval on the uplink data transmission channel, receive, from the network device, the start moment at which the uplink data transmission channel arrives at the network device, the end moment at which the uplink data transmission channel arrives at the network device, a start moment for sending the random access preamble, the duration in which the second terminal performs the channel listening, and the uplink timing advance of the first terminal; and a determining unit 1103, configured to determine the first time interval based on one or more of the start moment at which the uplink data transmission channel arrives at the network device, the end moment at which the uplink data transmission channel arrives at the network device, the start moment for sending the random access preamble, the duration in which the second terminal performs the channel listening, and the uplink timing advance of the first terminal.

As shown in FIG. 9, the second terminal 1200 may include a processing unit 1201.

The processing unit 1201 may be configured to perform the channel listening within the first time interval, where the channel listening is channel listening performed by the second terminal before a random access preamble is sent, the first time interval is reserved by the first terminal on the uplink data transmission channel, the first terminal does not send uplink data within the first time interval, and the first time interval is determined by using one or more of the following parameters:

a start moment (t1) at which the uplink data transmission channel arrives at the network device, an end moment (t2) at which the uplink data transmission channel arrives at the network device, a start moment (t3) at which the second terminal performs the channel listening, an end moment (t4) at which the second terminal performs the channel listening, duration ($T_{LBT}$) in which the second terminal performs the channel listening, and an uplink timing advance (TA) of the first terminal.

In this disclosure, if 0≤t1−t4<TA, the start moment (t5) of the first time interval is equal to t1−½×TA, and the end moment (t6) of the first time interval is equal to t4+½×TA; or if 0<t4−t1≤$T_{LBT}$, t5=t1−½×TA and t6=t4+½×TA; or if $T_{LBT}$<t4−t1≤t2−t1−½×TA, t5=t4−½×TA−$T_{LBT}$ and t6=t4+½×TA; or if t2−t1−½×TA<t4−t1<t2−t1+$T_{LBT}$, t5=t4−½×TA−$T_{LBT}$ and t6=t2−½×TA.

For the foregoing manners of determining the first time interval, refer to the embodiments shown in FIG. 8A to FIG. 8C. Details are not described herein again.

It may be understood that for specific implementations of the functional units included in the network device 1000, refer to related functions of the network device in the method embodiment corresponding to FIG. 8A, FIG. 8B, or FIG. 8C. For specific implementations of the functional units included in the first terminal 1100, refer to related functions of the first terminal in the method embodiment corresponding to FIG. 8A, FIG. 8B, or FIG. 8C. For specific implementations of the functional units included in the second terminal 1200, refer to related functions of the second terminal in the method embodiment corresponding to FIG. 8A, FIG. 8B, or FIG. 8C. Details are not described herein again.

In addition, an embodiment of the present disclosure further provides a wireless communications system. The wireless communications system may be the wireless communications system 200 shown in FIG. 2, or the wireless communications system 900 shown in FIG. 9, and may include a network device, a first terminal, and a second terminal. The network device may be the network device in the method embodiment corresponding to FIG. 8A, FIG. 8B, or FIG. 8C, the first terminal may be the first terminal in the method embodiment corresponding to FIG. 8A, FIG. 8B, or FIG. 8C, and the second terminal may be the second terminal in the method embodiment corresponding to FIG. 8A, FIG. 8B, or FIG. 8C.

For example, the first terminal is the terminal shown in FIG. 3. The terminal processor 304 is configured to invoke the instruction stored in the memory 312 to control the transmitter 306 to perform sending and control the receiver 308 to perform receiving. The transmitter 306 is configured to support the terminal in performing a data and/or signaling transmission process in FIG. 8A, FIG. 8B, or FIG. 8C. The receiver 308 is configured to support the terminal in performing a data and/or signaling receiving process in FIG. 8A, FIG. 8B, or FIG. 8C. The memory 312 is configured to store program code and data of the terminal.

For example, the second terminal is the terminal shown in FIG. 3. The terminal processor 304 is configured to invoke the instruction stored in the memory 312 to control the transmitter 306 to perform sending and control the receiver 308 to perform receiving. The transmitter 306 is configured to support the terminal in performing a data and/or signaling transmission process in FIG. 8A, FIG. 8B, or FIG. 8C. The receiver 308 is configured to support the terminal in performing a data and/or signaling receiving process in FIG. 8A, FIG. 8B, or FIG. 8C. The memory 312 is configured to store program code and data of the terminal.

Specifically, the first terminal and the second terminal each may be the terminal 300 shown in FIG. 3, and the network device may be the network device 400 shown in FIG. 4. The first terminal may be the first terminal 1100 shown in FIG. 9, the second terminal may be the second terminal 1200 shown in FIG. 9, and the network device may be the network device 1000 shown in FIG. 9. For specific implementations of the network device, the first terminal, and the second terminal, refer to the method embodiment corresponding to FIG. 8A, FIG. 8B, or FIG. 8C. Details are not described herein again.

The network device shown in FIG. 4 is used as an example. The network device processor 405 is configured to control the transmitter 407 to perform sending and control the receiver 409 to perform receiving. The transmitter 407 is configured to support the network device in performing a data and/or signaling transmission process in FIG. 8A, FIG. 8B, or FIG. 8C. The receiver 409 is configured to support the network device in performing a data and/or signaling receiving process in FIG. 8A, FIG. 8B, or FIG. 8C. The memory 405 is configured to store program code and data of the network device.

All or some of the foregoing embodiments may be implemented by using software, hardware, firmware, or any combination thereof. When software is used to implement the embodiments, the embodiments may be implemented partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In conclusion, in the embodiments of the present disclosure, the first terminal reserves the first time interval on the uplink data transmission channel, so that the second terminal performs the channel listening before the physical random access channel within the first time interval, thereby avoiding interference caused by the uplink data transmission channel to the channel listening before the physical random access channel, and improving a success rate of transmission on the physical random access channel. Specifically, the first time interval may be determined by the first terminal. In this manner, the first terminal may alternatively actively avoid, based on the location of the PRACH slot, the impact on the LBT before the PRACH, thereby reducing signaling overheads. Alternatively, the first time interval may be determined and notified by the network device to the first terminal. In this manner, the first terminal determines, based on signaling of the network device, whether to avoid and how long to avoid impact on the LBT before the PRACH, instead of actively avoiding, based on the location of the PRACH slot, the impact on the LBT before the PRACH. In this way, calculation overheads of the first terminal can be reduced, and an excessive waste of resources that is caused by active avoidance of the first terminal (for example, a case in which a relatively large quantity of PRACH slots are configured in a network, but a relatively small quantity of users actually need to initiate uplink access) can be avoided.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a read-only memory ROM, a random access memory RAM, a magnetic disk, or an optical disc.

What is claimed is:

1. A method, comprising:
    receiving, by a first terminal from a network device, indication information that is of a first time interval, wherein the indication information indicates a first duration of the first time interval and a start moment of the first time interval or an end moment of the first time interval;
    determining, by the first terminal, the first time interval according to the indication information;
    reserving, by the first terminal, the first time interval on an uplink data transmission channel, wherein the first terminal does not send uplink data within the first time interval, the first time interval is used by a second terminal to perform channel listening before sending a random access preamble, and the first time interval is determined by using one or more of the following parameters:
    a start moment (t1) at which the uplink data transmission channel arrives at a network device, an end moment (t2) at which the uplink data transmission channel arrives at the network device, a start moment (t3) at which the second terminal performs the channel listening, an end moment (t4) at which the second terminal performs the channel listening, a second duration ($T_{LBT}$) in which the second terminal performs the channel listening, or an uplink timing advance (TA) of the first terminal, wherein:
    if $0 \leq t1-t4 < TA$, the start moment (t5) of the first time interval is equal to $t1-\frac{1}{2} \times TA$, and the end moment (t6) of the first time interval is equal to $t4+\frac{1}{2} \times TA$; or
    if $0 < t4-t1 \leq T_{LBT}$, $t5 = t1-\frac{1}{2} \times TA$ and $t6 = t4+\frac{1}{2} \times TA$; or
    if $T_{LBT} < t4-t1 \leq t2-t1-\frac{1}{2} \times TA$, $t5 = t4-\frac{1}{2} \times TA - T_{LBT}$ and $t6 = t4+\frac{1}{2} \times TA$; or
    if $t2-t1-\frac{1}{2} \times TA < t4-t1 < t2-t1+T_{LBT}$, $t5 = t4-\frac{1}{2} \times TA - T_{LBT}$ and $t6 = t2-\frac{1}{2} \times TA$.

2. The method according to claim 1, wherein before reserving, by the first terminal, the first time interval on an uplink data transmission channel, the method further comprises:
    receiving, by the first terminal, indication information that is of the first time interval and that is sent by the network device, wherein the indication information further indicates the start moment of the first time interval and the end moment of the first time interval; and
    determining, by the first terminal, the first time interval according to the indication information.

3. The method according to claim 1, wherein before reserving, by the first terminal, the first time interval on an uplink data transmission channel, the method further comprises:
    receiving, by the first terminal from the network device, the start moment at which the uplink data transmission channel arrives at the network device, the end moment at which the uplink data transmission channel arrives at the network device, a start moment for sending the random access preamble, the second duration in which the second terminal performs the channel listening, and the uplink timing advance of the first terminal; and
    determining, by the first terminal, the first time interval based on one or more of the start moment at which the uplink data transmission channel arrives at the network device, the end moment at which the uplink data transmission channel arrives at the network device, the start moment for sending the random access preamble, the second duration in which the second terminal performs the channel listening, and the uplink timing advance of the first terminal.

4. A terminal operating as a first terminal, comprising a transmitter, a receiver, a memory, and a processor coupled to the memory, wherein the processor is configured to invoke an instruction stored in the memory to control the transmitter to send a signal and control the receiver to receive a signal, wherein the processor is further configured to:
    receive, from a network device, indication information that is of a first time interval, wherein the indication information indicates a first duration of the first time interval and a start moment of the first time interval or an end moment of the first time interval;
    determine the first time interval according to the indication information;
    reserve the first time interval on an uplink data transmission channel, wherein the first terminal does not send uplink data within the first time interval, the first time interval is used by a second terminal to perform channel listening before sending a random access preamble, and the first time interval is determined by using one or more of the following parameters:

a start moment (t1) at which the uplink data transmission channel arrives at a network device, an end moment (t2) at which the uplink data transmission channel arrives at the network device, a start moment (t3) at which the second terminal performs the channel listening, an end moment (t4) at which the second terminal performs the channel listening, a second duration ($T_{LBT}$) in which the second terminal performs the channel listening, or an uplink timing advance (TA) of the first terminal, wherein:

if $0 \leq t1-t4 < TA$, the start moment (t5) of the first time interval is equal to $t1-\frac{1}{2} \times TA$, and the end moment (t6) of the first time interval is equal to $t4+\frac{1}{2} \times TA$; or if $0 < t4-t1 \leq T_{LBT}$, $t5=t1-\frac{1}{2} \times TA$ and $t6=t4+\frac{1}{2} \times TA$; or if $T_{LBT} < t4-t1 \leq t2-t1-\frac{1}{2} \times TA$, $t5=t4-\frac{1}{2} \times TA-T_{LBT}$ and $t6=t4+\frac{1}{2} \times TA$; or if $t2-t1-\frac{1}{2} \times TA < t4-t1 < t2-t1+T_{LBT}$, $t5=t4-\frac{1}{2} \times TA-T_{LBT}$ and $t6=t2-\frac{1}{2} \times TA$.

5. The terminal according to claim 4, wherein before the processor reserves the first time interval on the uplink data transmission channel, the receiver is configured to receive indication information that is of the first time interval and that is sent by the network device, wherein the indication information further indicates the start moment of the first time interval and the end moment of the first time interval; and the processor is further configured to determine the first time interval according to the indication information.

6. The terminal according to claim 4, wherein before the processor reserves the first time interval on the uplink data transmission channel, the receiver is configured to receive, from the network device, the start moment at which the uplink data transmission channel arrives at the network device, the end moment at which the uplink data transmission channel arrives at the network device, a start moment for sending the random access preamble, the second duration in which the second terminal performs the channel listening, and the uplink timing advance of the first terminal; and the processor is further configured to determine the first time interval based on one or more of the start moment at which the uplink data transmission channel arrives at the network device, the end moment at which the uplink data transmission channel arrives at the network device, the start moment for sending the random access preamble, the second duration in which the second terminal performs the channel listening, and the uplink timing advance of the first terminal.

7. A network device, comprising a transmitter, a receiver, a memory, and a processor coupled to the memory, wherein the processor is configured to invoke an instruction stored in the memory to control the transmitter to send a signal and control the receiver to receive a signal, wherein the transmitter is configured to send, to a first terminal, indication information indicating a first time interval, wherein the first time interval is determined by the first terminal according to indication information that is of a first time interval, wherein the indication information indicates a first duration of the first time interval and a start moment of the first time interval or an end moment of the first time interval, wherein the first time interval is reserved by the first terminal on an uplink data transmission channel, the first terminal does not send uplink data within the first time interval, the first time interval is used by a second terminal to perform channel listening before sending a random access preamble, and the first time interval is determined by using one or more of the following parameters:

a start moment (t1) at which the uplink data transmission channel arrives at the network device, an end moment (t2) at which the uplink data transmission channel arrives at the network device, a start moment (t3) at which the second terminal performs the channel listening, an end moment (t4) at which the second terminal performs the channel listening, second duration ($T_{LBT}$) in which the second terminal performs the channel listening, or an uplink timing advance (TA) of the first terminal, wherein:

if $0 \leq t1-t4 < TA$, the start moment (t5) of the first time interval is equal to $t1-\frac{1}{2} \times TA$, and the end moment (t6) of the first time interval is equal to $t4+\frac{1}{2} \times TA$; or if $0 < t4-t1 \leq T_{LBT}$, $t5=t1-\frac{1}{2} \times TA$ and $t6=t4+\frac{1}{2} \times TA$; or if $T_{LBT} < t4-t1 \leq t2-t1-\frac{1}{2} \times TA$, $t5=t4-\frac{1}{2} \times TA-T_{LBT}$ and $t6=t4+\frac{1}{2} \times TA$; or if $t2-t1-\frac{1}{2} \times TA < t4-t1 < t2-t1+T_{LBT}$, $t5=t4-\frac{1}{2} \times TA-T_{LBT}$ and $t6=t2-\frac{1}{2} \times TA$.

* * * * *